US010976537B2

(12) United States Patent
Tetaz

(10) Patent No.: US 10,976,537 B2
(45) Date of Patent: Apr. 13, 2021

(54) COMPACT TELESCOPE HAVING A PLURALITY OF FOCAL LENGTHS COMPENSATED FOR BY A DEFORMABLE MIRROR

(71) Applicant: THALES, Courbevoie (FR)

(72) Inventor: Nicolas Tetaz, Cannes (FR)

(73) Assignee: THALES, Courbevoie (FR)

( * ) Notice: Subject to any disclaimer, the term of this patent is extended or adjusted under 35 U.S.C. 154(b) by 492 days.

(21) Appl. No.: 15/839,608

(22) Filed: Dec. 12, 2017

(65) Prior Publication Data
US 2018/0164572 A1 Jun. 14, 2018

(30) Foreign Application Priority Data
Dec. 13, 2016 (FR) ...................................... 1601769

(51) Int. Cl.
*G02B 23/06* (2006.01)
*G02B 13/00* (2006.01)
(Continued)

(52) U.S. Cl.
CPC ......... *G02B 23/06* (2013.01); *G02B 13/0065* (2013.01); *G02B 17/0642* (2013.01);
(Continued)

(58) Field of Classification Search
CPC .... G02B 23/06; G02B 26/06; G02B 27/0012; G02B 17/0642; G02B 17/0694;
(Continued)

(56) References Cited

U.S. PATENT DOCUMENTS 4,101,195 A * 7/1978 Frosch ............... G02B 17/0631
359/366
4,993,818 A * 2/1991 Cook ................. G02B 17/0694
359/366

(Continued)

FOREIGN PATENT DOCUMENTS

EP 1 637 914 A 3/2006

OTHER PUBLICATIONS

Z. Xin et al., "Three mirror anastigmatic zoom system using deformable mirrors," International Symposium on Photoelectronic Detection and Imaging 2011: Space Exploration Technologies and Applications, vol. 8196, No. 1, Jun. 9, 2011, pp. 1-8, XP060016106.

(Continued)

*Primary Examiner* — Stephone B Allen
*Assistant Examiner* — Rahman Abdur
(74) *Attorney, Agent, or Firm* — BakerHostetler

(57) ABSTRACT

A three-aspherical-mirror anastigmat telescope comprises: means for moving the third mirror linearly along the optical axis of the telescope to make the focal length of the telescope change between a minimum focal length and a maximum focal length, a deformable and controllable mirror, means for changing the optical path between the deformable mirror and the detector, the third mirror having a new conicity determined from an initial conicity, the initial conicity determined from the Korsch equations, the new conicity determined so that the telescope has, in the absence of the deformable mirror and for the minimum and maximum focal lengths, aberrations that are compensable by the deformable mirror, the fixed median position of the deformable mirror and the form of its surface, for the minimum focal length and maximum focal length, respectively, being determined so as to correct the compensable aberrations and (Continued)

to optimize image quality in the focal plane of the telescope according to a preset criterion.

12 Claims, 20 Drawing Sheets

(51) Int. Cl.
  *G02B 26/08* (2006.01)
  *G02B 26/06* (2006.01)
  *G02B 27/00* (2006.01)
  *G02B 17/06* (2006.01)
(52) U.S. Cl.
  CPC ......... *G02B 17/0694* (2013.01); *G02B 26/06* (2013.01); *G02B 26/0816* (2013.01); *G02B 27/0012* (2013.01)
(58) Field of Classification Search
  CPC ............ G02B 13/0065; G02B 26/0816; G02B 23/04; G02B 17/06; G02B 17/0888; G02B 17/0631; G02B 17/0663; G02B 17/0657; G02B 27/0068; G02B 23/02; G02B 17/0852; G02B 13/0045; G02B 17/0896; G02B 27/0025; G02B 23/12; G02B 17/08; G02B 3/14; G02B 27/40

USPC ........................................................ 359/399
See application file for complete search history.

(56) References Cited

U.S. PATENT DOCUMENTS

| | | | |
|---|---|---|---|
| 5,144,476 A | 9/1992 | Kebo | |
| 6,084,727 A | 7/2000 | Cook | |
| 6,333,811 B1 | 12/2001 | Tatian et al. | |
| 7,292,385 B2 * | 11/2007 | Dupuis | G02B 26/06 |
| | | | 359/291 |
| 8,746,884 B2 * | 6/2014 | Saito | A61B 3/1015 |
| | | | 351/205 |

OTHER PUBLICATIONS

G.W. Forbes, "Characterizing the shape of freeform optics," Optics Express, vol. 20, No. 3, Jan. 30, 2012, pp. 2483-2499.

K. Seidl et al., "Wide field-of-view all-reflective objectives designed for multispectral image acquisition in photogrammetric applications," Optical Complex Systems, vol. 8172, 2011.

* cited by examiner

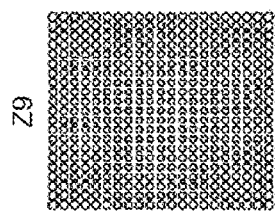
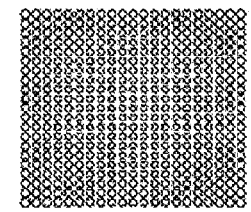
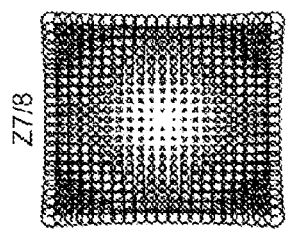
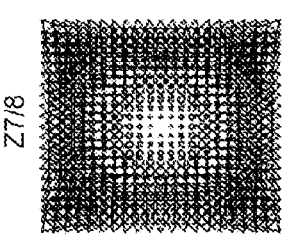
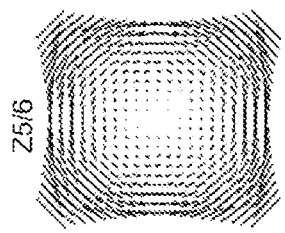
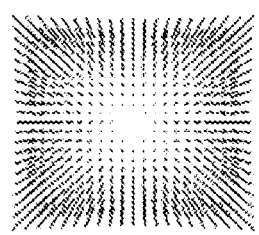
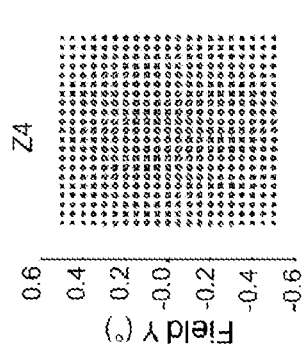
FIG.8a
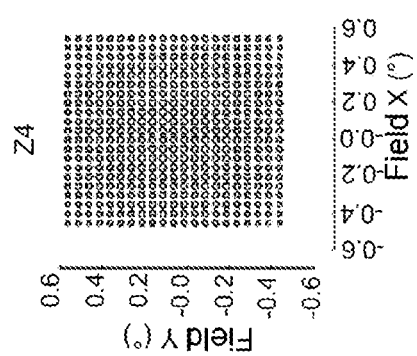
FIG.8b
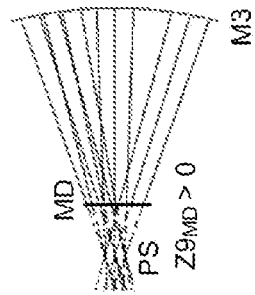
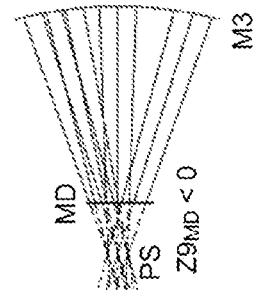

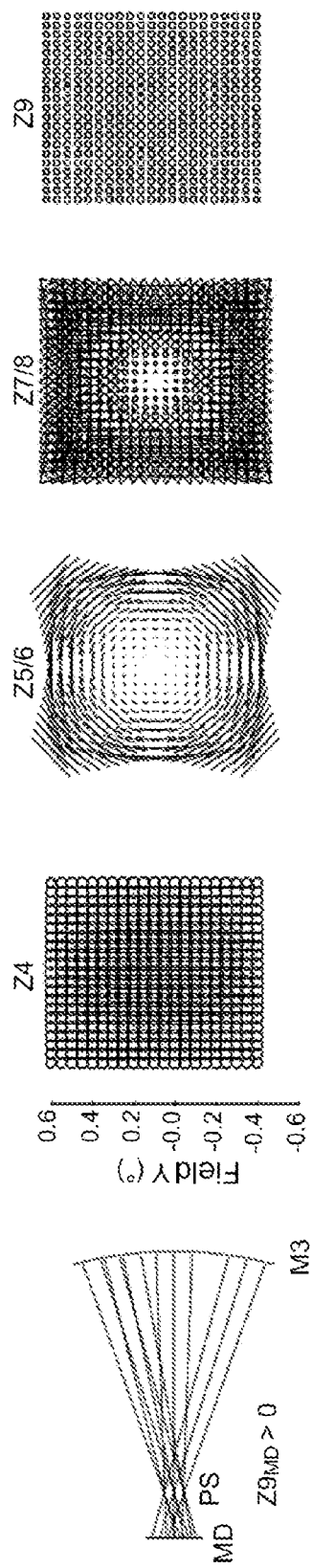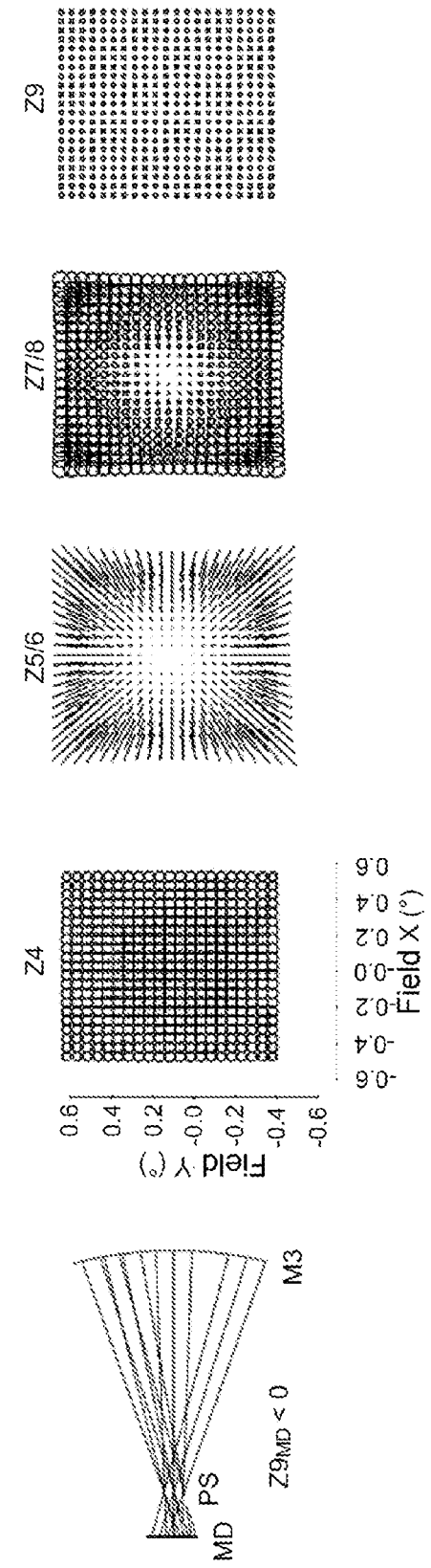
FIG.9a
FIG.9b

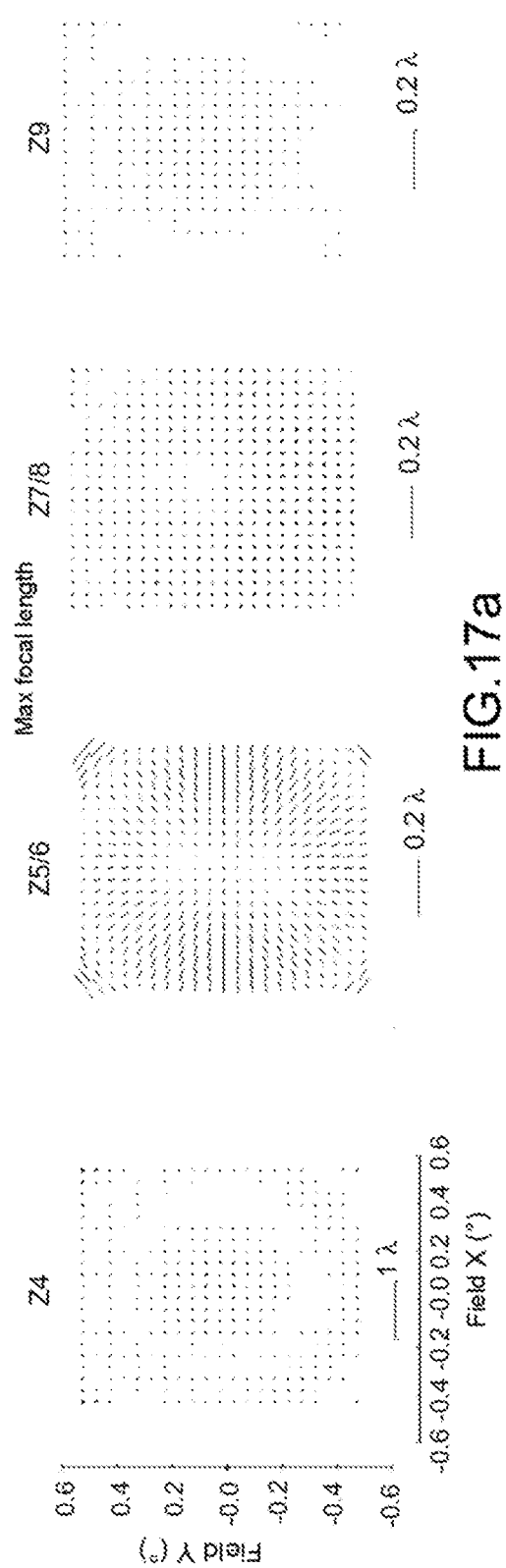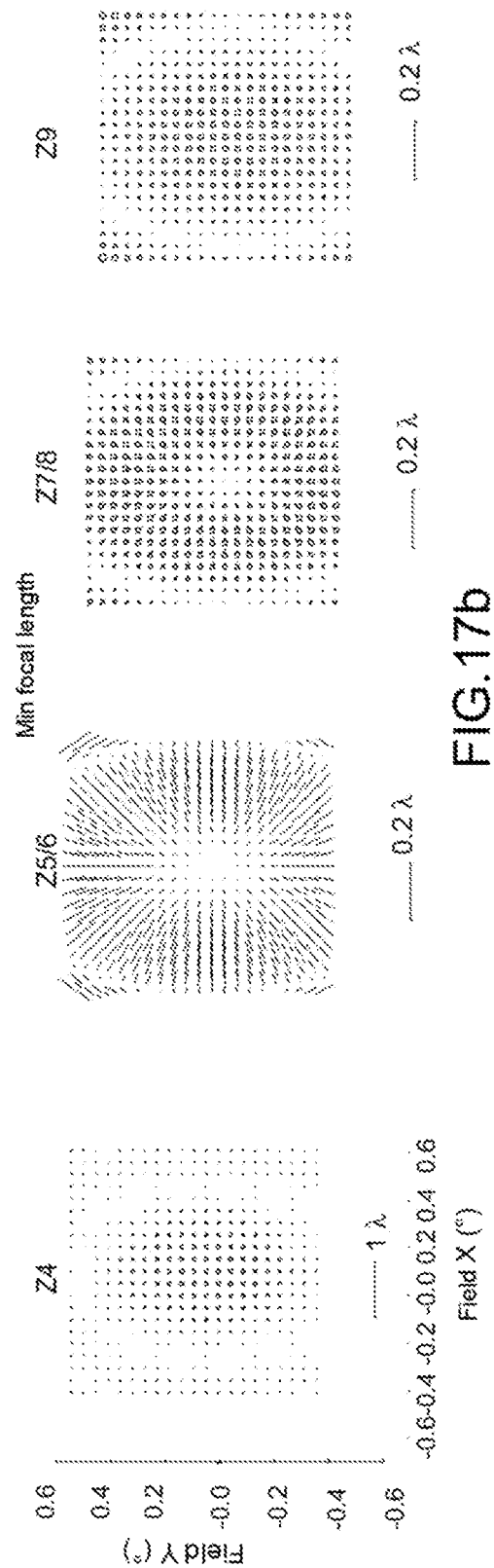
FIG.17a
FIG.17b

COMPACT TELESCOPE HAVING A PLURALITY OF FOCAL LENGTHS COMPENSATED FOR BY A DEFORMABLE MIRROR

CROSS-REFERENCE TO RELATED APPLICATIONS

This application claims priority to foreign French patent application No. FR 1601769, filed on Dec. 13, 2016, the disclosure of which is incorporated by reference in its entirety.

FIELD OF THE INVENTION

The field of the invention is that of telescopes, and in particular that of observation telescopes carried on board satellites. More precisely, the field of the invention relates to catoptric systems of large focal lengths.

BACKGROUND

Current space telescopes have a single focal length. One known type of telescope is the Korsch telescope. The Korsch telescope, also referred to as a three-mirror anastigmat (TMA) telescope, is a type of anastigmatic telescope comprising (in concave-convex-concave order) three aspherical mirrors i.e. at least a concave first mirror M1, a convex second mirror M2 and a concave third mirror M3. The mirrors are aspherical and they have forms that are conventional in such telescopes. The first, second and third mirrors M1, M2 and M3 are aspherical, of set forms, each mirror being characterized by at least two parameters, a radius of curvature R and a conicity c.

This optical system has, as is well known in the art, an optical axis O that is defined by the ray passing through the center of the entrance pupil $P_E$ and perpendicular to this pupil.

The three mirrors M1, M2 and M3 are arranged so that the first mirror and the second mirror form from an object at infinity an intermediate image between the second mirror and the third mirror, the third mirror forming from this intermediate image a final image in the focal plane of the telescope, in which plane a detector D is placed. By applying the Korsch equations, which are well known in the art, the respective parameters and positions of the three mirrors may be easily calculated. The theoretical solution is of very high quality, this being the key benefit of this type of telescope.

The quality of an optical system may be evaluated by comparing an ideal diffraction-limited light wave and the actual light wave output from the optical system i.e. affected by defects in the optical system passed through. Analysis of the difference between the theoretical wave and the actual wave allows the types of defects or aberrations in the optical system to be identified.

It is known that the main types of geometrical aberration are: spherical aberration, astigmatism, coma, field curvature (defocus in the field) and distortion.

Polynomials, and more particularly Zernike polynomials, are conventionally used to more easily qualify the various types of aberrations in a wavefront (i.e. a surface) output from an optical system.

Zernike surfaces are the most commonly used. A Zernike surface is defined in polar coordinates in a space $(\rho, \theta, z)$ and if $z(\rho, \theta)$ is the z-coordinate of a point on this surface, the following relationship holds:

$$z(\rho, \theta) = \frac{c(\rho^2)}{1 + \sqrt{1 - (1+k)\,c^2\rho^2}} + \sum C_j Z_j$$

Zj being a Zernike polynomial of order j and Cj being the constant associated with this polynomial, j being an index respectively varying between 0 and an integer number, k being the conic constant and c the curvature of the surface.

A given surface represented by these polynomials is referred to as a φ-polynomial surface. This surface is therefore characterized by the values of the coefficients of these polynomials.

The advantage of representing wavefronts with orthogonal Zernike polynomials is that each polynomial of the considered basis corresponds to a different category of aberration. It is thus possible to determine the nature of the aberrations present in a wavefront.

The table below gives the various "fringe Zernike" polynomials as a function of their order (here 1 to 16), and the corresponding type of aberration.

| Order | Polynomial | Aberration(s) |
| --- | --- | --- |
| 1 | 1 | Piston |
| 2 | $\rho\,\text{Cos}[\theta]$ | Tilt in x |
| 3 | $\rho\,\text{Sin}[\theta]$ | Tilt in y |
| 4 | $-1 + 2\,\rho^2$ | Defocus |
| 5 | $\rho^2\,\text{Cos}[2\,\theta]$ | Astigmatism at 0° |
| 6 | $\rho^2\,\text{Sin}[2\,\theta]$ | Astigmatism at 45° |
| 7 | $\rho\,(-2 + 3\,\rho^2)\,\text{Cos}[\theta]$ | Coma in x |
| 8 | $\rho\,(-2 + 3\,\rho^2)\,\text{Sin}[\theta]$ | Coma in y |
| 9 | $1 - 6\,\rho^2 + 6\,\rho^4$ | Spherical aberration and defocus |
| 10 | $\rho^3\,\text{Cos}[3\,\theta]$ | Trefoil |
| 11 | $\rho^3\,\text{Sin}[3\,\theta]$ | Trefoil |
| 12 | $\rho^2\,(-3 + 4\,\rho^2)\,\text{Cos}[2\,\theta]$ | 2nd-order astigmatism |
| 13 | $\rho^2\,(-3 + 4\,\rho^2)\,\text{Sin}[2\,\theta]$ | 2nd-order astigmatism |
| 14 | $\rho\,(3 - 12\,\rho^2 + 10\,\rho^4)\,\text{Cos}[\theta]$ | 2nd-order coma in x |
| 15 | $\rho\,(3 - 12\,\rho^2 + 10\,\rho^4)\,\text{Sin}[\theta]$ | 2nd-order coma in y |
| 16 | $-1 + 12\,\rho^2 - 30\,\rho^4 + 20\,\rho^6$ | 2nd-order spherical aberration |

Adopting the paradigm of fringe Zernike polynomials, the various types of aberration correspond to the following terms:
  defocus corresponds to the term Z4;
  astigmatism corresponds to the terms Z5 and Z6;
  coma corresponds to the terms Z7 and Z8;
  first-order spherical order aberration corresponds to Z9; and
  second-order spherical order aberration corresponds to Z16.

Conventionally, it is known to improve the image quality of optical instruments by placing a deformable mirror MD level with the exit pupil, such a mirror commonly being referred to as a free-form surface.

The theoretical solution of the 3-mirror Korsch telescope being of very high quality, conventionally the deformable mirror does not form an integral part of the optics of this type of telescope and is used only to compensate for defects due to imperfections in the actual system post-manufacture with respect to the theoretical solution
  on the ground in order to compensate for atmospheric turbulence (past application of deformable mirrors),
  in orbit to compensate for defects in the mirror M1. Specifically, the mirror M1 being complex to produce, the deformable mirror allows production constraints to be relaxed while preserving a good performance. Likewise, a mirror M1 that is lighter and less rigid is permissible because its deformations will be compensated for by the deformable mirror.

Thus, generally a deformable mirror is used at the exit pupil in order to correct constant field aberrations. When it is positioned at the pupil of an instrument, deformation of the deformable mirror by addition of a Zernike polynomial introduces constant field aberrations. For example, if a polynomial Z5 of nonzero value is added to the deformable mirror, each point of the field will be impacted by astigmatism.

FIG. 1 illustrates a Korsch telescope 10 with a deformable mirror MD placed level with the exit pupil $P_S$ of the telescope.

The surface S that the deformable mirror must have in order to allow defects to be corrected is referred to as a free-form surface, meaning that it is not axisymmetric.

There are various ways to define free-form surfaces. Generally, each definition meets a particular need and is suitable for one specific calculation and optimization method. Whatever the mathematical formulation used to define a free-form surface, it is possible to pass from one formulation to another via a mathematical conversion. In other words, a given free-form surface may be defined by a plurality of mathematical formulations. By way of example, a free-form surface may have the following mathematical definitions:

free-form surface defined by XY polynomials. More specifically, this surface being defined in a space (x, y, z), if z(x, y) is the z-coordinate of a point on this surface, the following relationship holds:

$$z(x, y) = \frac{c(x^2 + y^2)}{1 + \sqrt{1 - (1+k) c^2(x^2 + y^2)}} + \sum A_i x^j y^k$$

c being the curvature of the surface, k being the conic constant, $A_i$ being constants, and i, j and k being indices varying between 0 and three integers, respectively.

This surface corresponds to an extension of the conventional definition of aspherical surfaces in that it is a generalization thereof to a surface that is not axisymmetric;

free-form surface defined by φ polynomials such as the Zernike polynomials defined above or the Q-Forbes polynomials.

The publication by G. W. Forbes entitled "Characterizing the shape of freeform optics" 30.01 2012/Vol. 20, No 3/Optics Express 2483 describes the surfaces defined by Q-Forbes phi-polynomials;

free-form surface defined by local equations of free-form sub-surfaces of different definitions;

free-form surface defined by hybrid descriptions such as, for example, surfaces defined by a mixture of phi-polynomial surfaces and what are called "NURBS" surfaces (NURBS being the acronym of Non-Uniform Rational Basis Splines).

The mirror MD is deformable and controllable, i.e. it is possible to obtain any desired surface by controlling the mirror, the desired surface of MD being calculated so as to compensate for defects in the actual system. The desired surface is decomposed into polynomials, and this surface is generated by applying in a controlled way the right coefficients via the system for controlling the mirror. The shape of the surface may then be changed by modifying the values of the coefficients.

It is thus possible, by directly controlling the values of the coefficients Cj, to introduce into the design the wanted aberrations.

An example of a mirror MD is the deformable mirror MADRAS: Miroir Actif Déformable et Régulé pour Applications Spatiales (Controlled and Deformable Active Mirror for Space Applications).

It may be advantageous to be able to change focal length on-the-fly. Specifically, changing focal length on-the-fly allows the field of view and/or resolution of the image to be changed with one and the same instrument.

Present-day telescopes may be divided into two families:
telescopes with two focal lengths, which can capture either a high-resolution image of a narrow field or a lower-resolution image of a wider field; and
telescopes comprising a continuous all-reflective zoom that allow focal length to be changed on-the-fly.

By way of examples of two-focal-length telescopes, mention may be made of telescopes that are based on separation of a common channel into two channels of different focal lengths. The separation may be achieved spectrally: a given field is separated by a dichroic plate if the wavelength domain allows such a spectral separation (e.g. visible and infrared). It may be achieved by separating the received flux into a reflected flux and a transmitted flux by means of an optical density, if it is a question of a wavelength domain that is not separable spectrally (e.g. 50% of the flux is reflected, 50% transmitted).

Advantages of these two-focal-length solutions employing common channel separation:
Two focal lengths simultaneously;
Observation of a common field of view.
Drawbacks of these solutions:
Addition of optical elements (dichroic plate/density+mirrors/specific lenses to each of the channels);
Detectors specific to each channel;
If the spectral domain of the channels is not separable spectrally, a substantial amount of the flux will necessarily be lost;
Only two focal lengths.

Mention may also be made of telescopes in which the field of view is divided: the two channels then do not receive the same field of view.

Advantage of these two-focal-length solutions employing field-of-view division:
Two focal lengths simultaneously.
Drawbacks of these solutions:
Addition of optical elements: mirrors/specific lenses to each of the channels;
Detectors specific to each channel;
Observation of a different field of view;
Only two focal lengths.

Another two-focal-length solution, described in U.S. Pat. No. 6,084,727, allows the focal length of the telescope to be changed by inserting reflective elements on the optical path.

Advantages of this solution employing insertion of reflective elements:
A single detector;
Observation of a common field of view.
Drawbacks of this solution:
Addition of optical elements: specific mirrors, to one of the channels;
Only two focal lengths;
Two focal lengths but not simultaneously.

By way of example of a telescope comprising a continuous all-reflective zoom, mention may be made of the telescope described in U.S. Pat. No. 6,333,811; it is based on a Cassegrain telescope with variable-magnification image relay thereby allowing a continuous zoom to be obtained.

Advantages of this solution:

A single detector;
Continuous zoom;
Observation of a common field of view;
No modification of the shape of the mirrors.
Drawbacks of this solution:
The number of mirrors: 7 mirrors, 3 of which are aspherical, 2 of which are free-form and 1 of which is a planar relay mirror;
Movement of two free-form mirrors which may be position-sensitive;
Telescope of Cassegrain type and therefore of limited field.

Moreover, zooms exist that use mirrors having deformable radii of curvature, an example of which is described in the publication by Kristof Seidl et al.: "Wide field-of-view all-reflective objectives designed for multispectral image acquisition in photogrammetric applications".
Advantages of this solution:
A single detector;
Continuous zoom;
Observation of a common field of view;
No movement of the mirrors.
Drawbacks of this solution:
Too bulky for long focal lengths, for example larger than 10 m;
Deformable mirrors work only with spherical mirrors of small diameters of about a few cm: they are therefore not compatible with the pupil sizes of space telescopes, typically larger than 0.5 m.

One aim of the present invention is to mitigate the aforementioned drawbacks by providing a compact multi-focal-length telescope that comprises three aspherical mirrors and one detector and that works with large pupil diameters, has a larger field of view than that of a Cassegrain (>1°), and that obtains a very high image quality at all its focal lengths.

SUMMARY OF THE INVENTION

One subject of the present invention is a three-aspherical-mirror anastigmat telescope comprising at least a concave first mirror, a convex second mirror, a concave third mirror and a detector, and having an optical axis,
the three mirrors being arranged so that the first mirror and the second mirror form from an object at infinity an intermediate image between the second mirror and the third mirror, the third mirror forming from this intermediate image a final image in the focal plane of the telescope, in which plane the detector is placed, the first, second and third mirrors being of a set form characterized by at least a radius of curvature and a conicity,
the telescope furthermore comprising:
means for moving the third mirror linearly along the optical axis of the telescope so as to make the focal length of the telescope change between at least a minimum focal length and a maximum focal length,
the telescope having at the minimum focal length a first exit pupil in a first position, and the telescope having at the maximum focal length a second exit pupil in a second position,
a deformable and controllable mirror having a deformable surface and placed in a fixed median position between the first and second positions,
means for changing the optical path between the deformable mirror and the detector, which means are configured so that the detector remains positioned in the focal plane of the telescope,
the third mirror having a new conicity determined from an initial conicity,
the initial conicity being determined from the Korsch equations,
the new conicity being determined so that the telescope has, in the absence of said deformable mirror and for the minimum and maximum focal lengths, aberrations that are compensable by said deformable mirror,
said fixed median position of said deformable mirror and the form of its surface, for the minimum focal length and maximum focal length, respectively, being determined so as to correct said compensable aberrations and to optimize image quality in the focal plane of the telescope according to a preset criterion.

Preferably, the form of the surface of the deformable mirror comprises at least a first aberration category and a second aberration category.

Advantageously, the first aberration category is first-order spherical aberration and the second aberration category is defocus.

Preferably, the form of the surface of the deformable mirror furthermore comprises a second-order spherical aberration in order to further improve image quality according to said criterion.

Advantageously, the new conicity differs from the initial conicity by more than 5% and by less than 30%.

According to one embodiment a new conicity of the first mirror and a new conicity of the second mirror are respectively determined from an initial conicity of the first mirror and from an initial conicity of the second mirror, the initial conicities being determined from the Korsch equations, the new conicities being determined so as to further improve the image quality of said telescope according to said criterion.

Preferably, the surface of the deformable mirror is defined from coefficients of polynomials. Advantageously, the coefficients are the coefficients of fringe Zernike polynomials.

According to one embodiment, the compensable aberrations are astigmatism and coma.

According to one embodiment:
a positive astigmatism is defined as an astigmatism for which a tangential focal point is located before a sagittal focal point,
a negative astigmatism is defined as an astigmatism for which a sagittal focal point is located before a tangential focal point,
a positive coma is defined as a coma for which the shape of the image spot of a point source is a "comet" the tail of which is directed away from the optical axis and,
a negative coma is defined as a coma for which a shape of the image spot of a point source is a "comet" the tail of which is directed toward the optical axis,
the compensable aberrations being positive astigmatism and positive coma for the maximum focal length, and positive astigmatism and negative coma for the minimum focal length.

According to one embodiment, the new conicity of the third mirror is determined so as to modify the sign of the astigmatism of the telescope for the minimum focal length, in the absence of the deformable mirror.

Preferably, the preset criterion consists in minimizing a wavefront error.

According to one embodiment, the telescope according to the invention has a plurality of intermediate focal lengths, the form of the surface of the deformable mirror associated with each intermediate focal length being calculated from the form of the surface for the minimum focal length and maximum focal length.

BRIEF DESCRIPTION OF THE DRAWING

Other features, aims and advantages of the present invention will become apparent on reading the detailed description which will follow and with regard to the appended drawings given by way of non-limiting example and in which:

The aforementioned

FIG. 2a illustrates the optical system for the maximum focal length and FIG. 2b illustrates the optical system for the minimum focal length.

FIG. 3a illustrates the optical system for the maximum focal length and FIG. 3b illustrates the optical system for the minimum focal length.

FIG. 5a illustrates these aberrations when the telescope is working at the maximum focal length, and FIG. 5b illustrates these aberrations when the telescope is working at the minimum focal length.

FIGS. 8a and 8b illustrate, for the initial system, the aberrations that result following the introduction of spherical aberration $Z9_{MD}$ into a deformable mirror as a function of its relative position with respect to the effective exit pupil, when MD is placed downstream of the effective exit pupil. FIG. 8a corresponds to $Z9_{MD}<0$ and FIG. 8b to $Z9_{MD}>0$.

FIGS. 9a and 9b illustrate, for the initial system, the aberrations that result following the introduction of spherical aberration $Z9_{MD}$ into a deformable mirror as a function of its relative position with respect to the effective exit pupil, when MD is placed upstream of the effective exit pupil. FIG. 9a correspond to $Z9_{MD}<0$ and FIG. 9b to $Z9_{MD}>0$.

FIG. 11a illustrates the various aberrations for the max focal length and FIG. 11b for the min focal length.

FIG. 13a illustrates the various aberrations for the max focal length and FIG. 13b for the min focal length.

FIGS. 17a and 17b illustrate the various aberrations in the focal plane of a telescope according to the invention, the mirrors M1, M2 and M3 of the telescope respectively having new conicities c'1, c'2 and c'3 and the deformable mirror MD of the telescope having a median position Pm and optimized values of $Z9_{MD}$, of $Z4_{MD}$ and of $Z16_{MD}$. FIG. 17a illustrates the various aberrations for the max focal length and FIG. 17b for the min focal length.

DETAILED DESCRIPTION

We will first of all describe a Korsch telescope with variable-focal-length capability. FIGS. 2 and 3 illustrate a 3-mirror Korsch telescope that is multi-focal length or that has a zoom function, the focal length being made to change via movement of the third mirror M3 along the optical axis of the telescope using means for creating a linear movement. Document U.S. Pat. No. 4,993,818 briefly describes the principle of such a system.

The movement of the mirror M3 between two extreme positions Pmin and Pmax allows focal length to be varied between a minimum focal length fmin and a maximum focal length fmax, respectively. By zoom, what is meant is an instrument that has at least two focal lengths fmin and fmax and is capable of working at intermediate focal lengths, via movement of the mirror M3.

According to one variant, the telescope has only two focal lengths, fmin and fmax, it is then said to be two-focal-length or bifocal.

Figure 1:
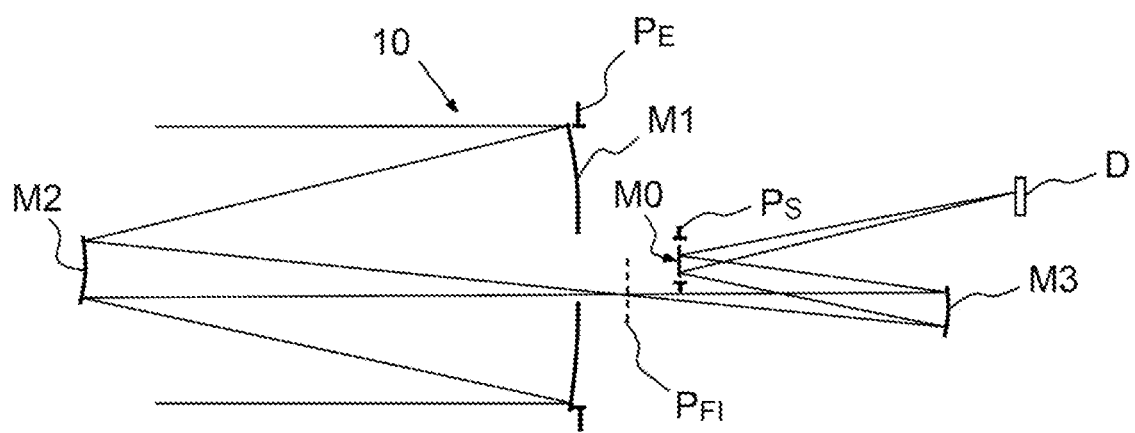
FIG. 1 illustrates a single-focal-length Korsch telescope with a deformable mirror placed level with the exit pupil of the telescope.
Figure 2A:
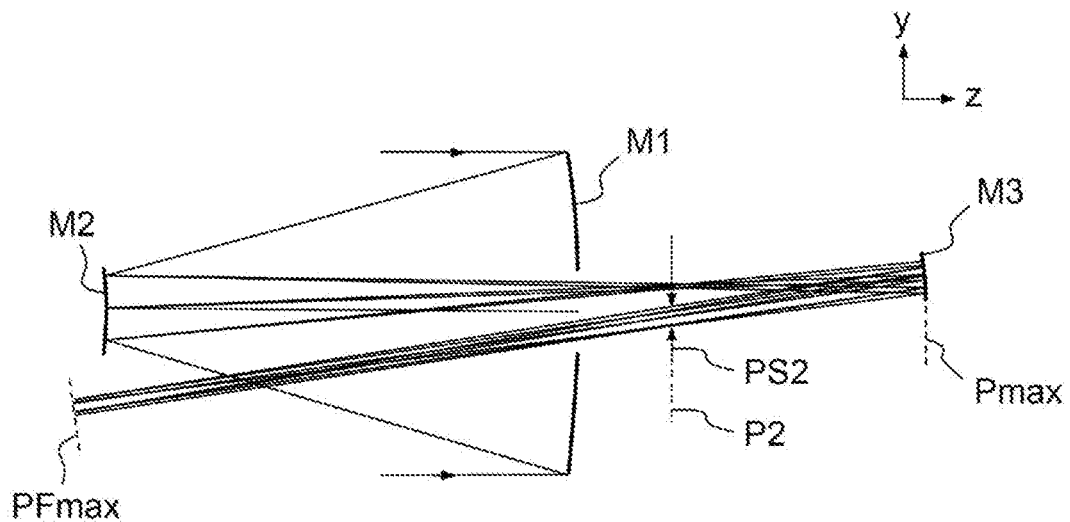
FIGS. 2a and 2b illustrate a multi-focal-length Korsch telescope seen in a YZ plane, the focal length being made variable via movement of the third mirror along the optical axis.
Figure 2B:
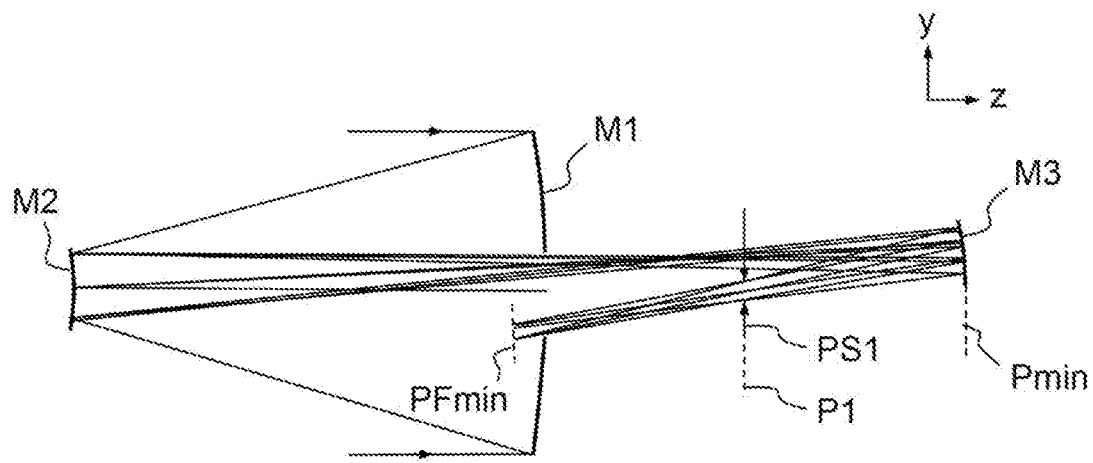
Figure 3A:
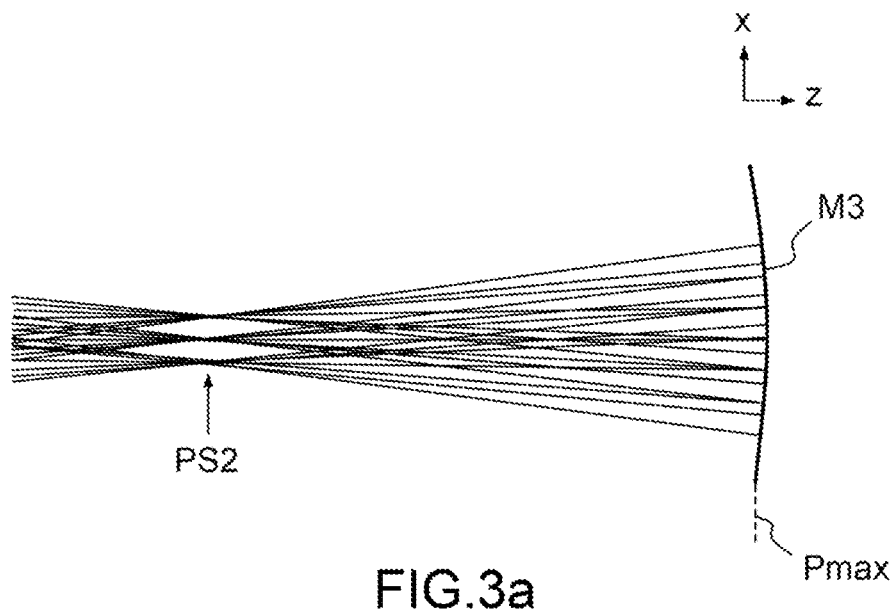
FIGS. 3a and 3b illustrate the telescope of FIGS. 2a and 2b seen in the XZ plane.
Figure 3B:
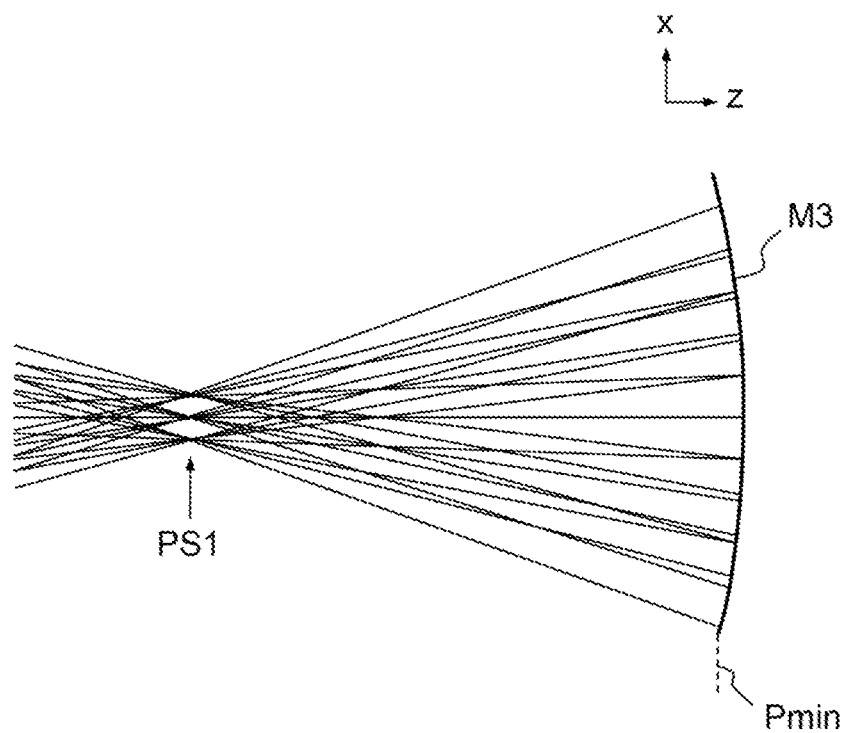

FIGS. 2a and 2b illustrate the telescope seen from the side in a YZ plane, FIG. 2a illustrating the telescope working with the maximum focal length and FIG. 2b with the minimum focal length. FIGS. 3a and 3b illustrate the telescope seen from the side in an XZ plane, FIG. 3a illustrating the telescope working with the maximum focal length and FIG. 3b with the minimum focal length.

For M3 at one of the extreme positions Pm in, the telescope has the minimum focal length fmin, a first exit pupil PS1 in a first position P1 and a focal plane PFmin (FIGS. 2b, 3b). For M3 at the other extreme position Pmax, the telescope has the maximum focal length fmax, a second exit pupil PS2 in a second position P2 and a focal plane Pmax (FIGS. 2a, 3a).

Since the position of the focal plane of the telescope varies with focal length, it is necessary to integrate means for changing the optical path between the third mirror M3 and the detector D, which are configured so that the detector remains positioned in the focal plane of the telescope. These means are described below for the case of a standard multi-focal-length telescope 20, and will be applied, further on, to a telescope according to the invention.

Figure 4A:
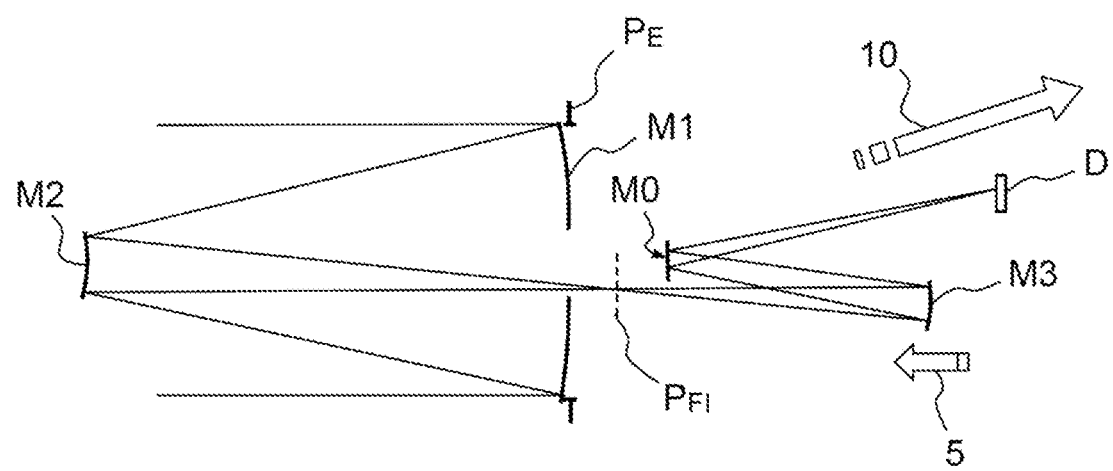
FIG. 4a illustrates a first variant of means for changing the optical path between the third mirror and the detector D.

According to a first variant, the means for changing the optical path between the third mirror M3 and the detector D include means 10 for translating the detector D along the optical axis O and along the Y-axis defined in FIG. 2a, such as illustrated in FIG. 4a.

Figure 4B:
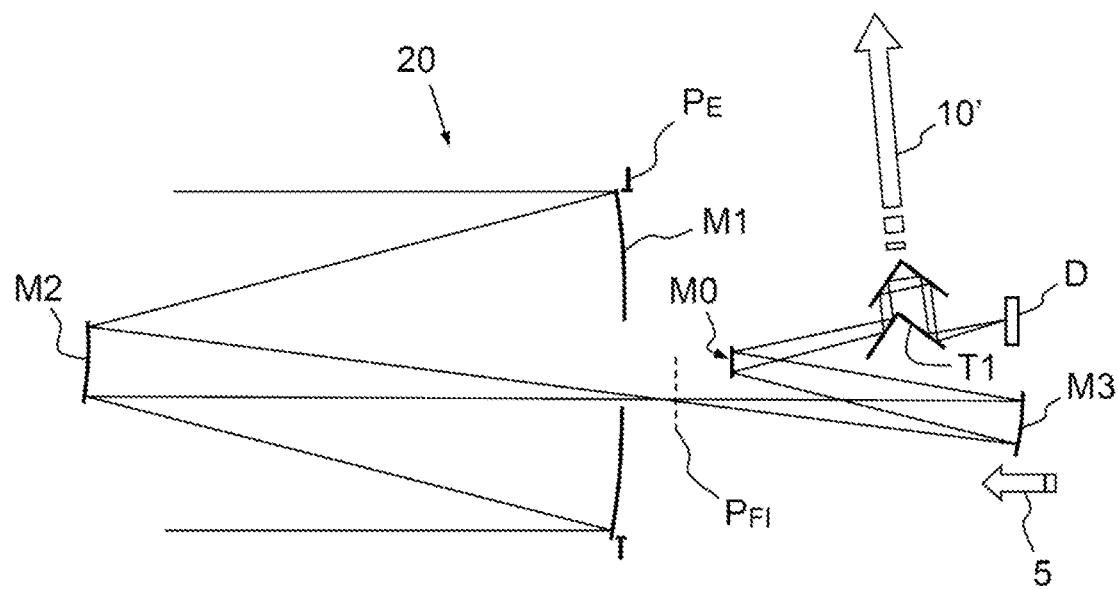
FIG. 4b illustrates a second variant of means for changing the optical path between the third mirror and the detector D, in which variant the detector D remains stationary, the means for changing the optical path comprising two roof-shaped mirrors T1 and T2, for one position of the mirror T2.
Figure 4C:
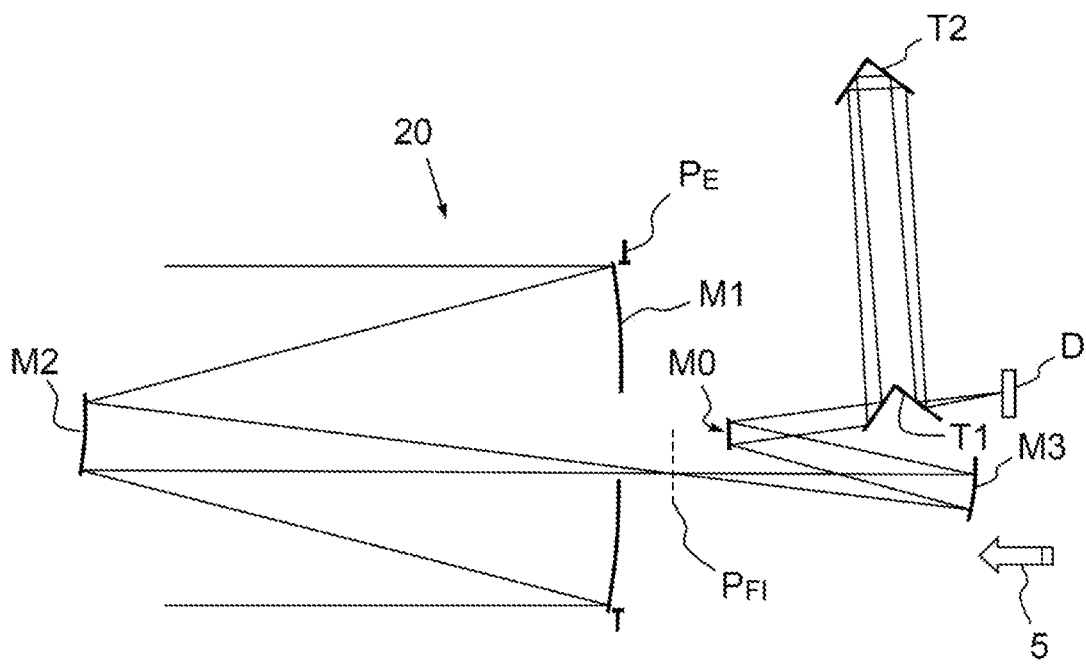
FIG. 4c illustrates the second variant of means for changing the optical path between the third mirror and the detector D, in which variant the detector D remains stationary, the means for changing the optical path comprising two roof-shaped mirrors T1 and T2, for another position of the mirror T2.

According to a second variant, which is illustrated in FIGS. 4b and 4c, the detector D remains stationary and the means for changing the optical path comprise two roof-shaped mirrors T1, T2 (i.e. two mirrors having two faces at about 90° to each other) located between the third mirror M3 and the detector D, and means 10' for translating one of the two roof-shaped mirrors, T2 in the example, the other remaining stationary, linearly along an axis that is not parallel to the optical axis, so as to make the optical path change. The sides of the "roof" of T1, which preferably have a slope of 45°, are not necessarily parallel to those of T2. FIG. 4b illustrates a first position of the roof-shaped mirror T2 corresponding to a first position of the mirror M3 (short focal length), and FIG. 4c illustrates a second position of the roof-shaped mirror T2 corresponding to a second position of the mirror M3 (longer focal length). A planar mirror M0 allows the beam to be folded in order to increase the readability of the overall optical system.

In order to allow the reasoning that led to the invention to be well understood, we will firstly describe the way in which a zoomable Korsch telescope is calculated. Parameters, called initial parameters, which are compatible both with the minimum focal length fmin and the maximum focal length fmax are determined, for the first, second and third mirrors, with a known prior-art ray-tracing software package.

Thus, using the Korsch equations, initial radii of curvature and conicities are determined for the two extreme focal lengths of our zoom.

For example, it is possible to solve the Korsch equations simultaneously for the two focal lengths fm in and fmax by using an identical radius of curvature M1 for the two focal lengths.

The starting point therefore consists of the values: R1, R2_fmax, R2_fmin, R3_fmax, R3_fmin, C1_fmax, C1_fmin, C2_fmax, C2_fmin, C3_fmax, C3_fmin.

The next stage of the optimization consists in constraining the radii of curvature and the conicities for the 2 extreme focal lengths to be identical.

The optimization is carried out in a conventional way using a ray-tracing software packages (CodeV, Zemax, Oslo, etc.). These software packages are based on the principle of minimization of an error function. Typically, the error function includes the image quality in the focal plane and the constraint of the focal lengths fmin and fmax.

Thus, with a first optimization of the image quality in the focal plane of the telescope according to a preset criterion, the initial parameters are determined:
Initial radii of curvature: R1, R2, R3 for M1, M2 and M3, respectively
Initial conicities: C1, C2, C3 for M1, M2 and M3, respectively The preset criterion for example consists in minimizing a wavefront error or WFE averaged over a plurality of points of the field, this type of criterion being well known in the art—typically it is sought to minimize the root-mean-square value or RMS WFE.

In this type of solution, the forms of the mirrors M1, M2 and M3, i.e. the forms defined by the parameters radius of curvature and conic constant, respect the equations established by M. Korsch, in order to obtain an aplanatic and anastigmatic solution, without field curvature. However, these equations can not be rigorously solved simultaneously for the two extreme focal lengths fmin and fmax.

A compromise must be made and image quality suffers as a result. Image quality remains acceptable for telescopes the volume of which is not greatly constrained (i.e. telescopes in which the rays are incident on the mirrors at small angles). In the field of space systems and solutions, it is essential to constrain volume. This solution is therefore not envisionable for space instruments of large focal length and pupil size i.e. in which the rays are incident on the mirrors at large angles.

An illustrative example is a two-focal-length telescope with:
Max focal length=37.5 m.
Min focal length: 15 m
Ratio of the zoom: 2.5
Diameter of the mirror M1: 1.1 m
Distance between M1 and M2: 1600 mm
Distance between the two extreme positions of M3: 250 mm
Distances between PS1 and PS2: 250 mm
Distance between PFmax and PFmin: 1600 mm (PF: focal plane).
The step of determining the initial parameters via a first optimization such as described above results in an initial telescope configuration in which the initial parameters have the following values:
R1=4000 mm C1=−1
R2=1000 mm C2=−2.1
R3=1200 mm C3=−0.61

Figure 5A:
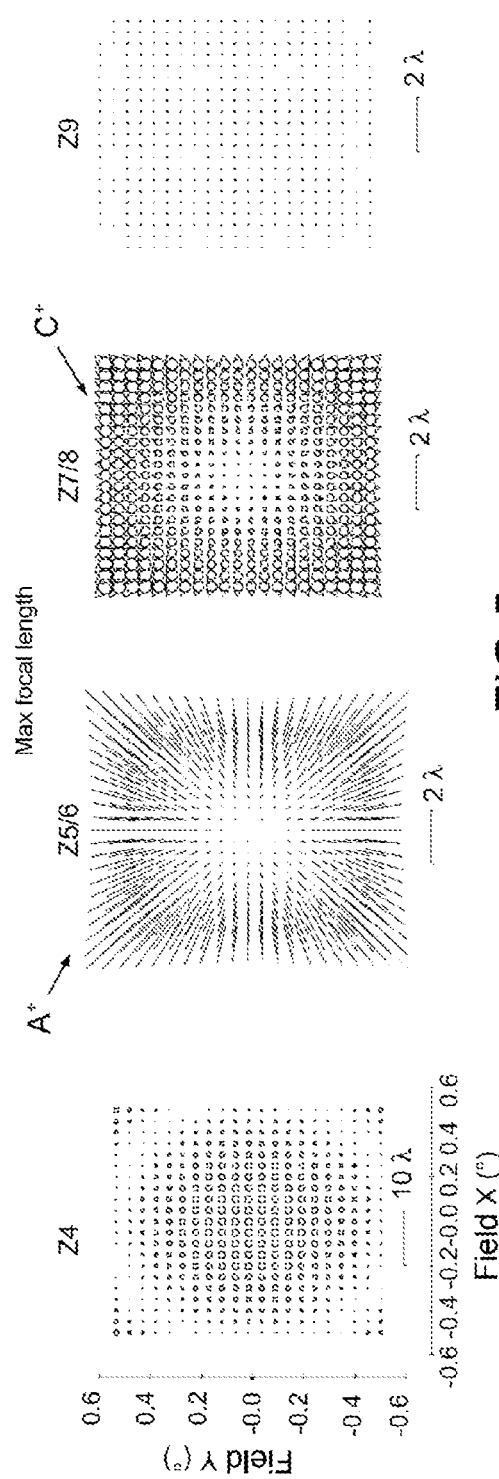
FIGS. 5a and 5b illustrate the aberrations present in the focal plane for a two-focal-length telescope the aspherical mirrors M1, M2 and M3 of which have initial parameters obtained by solving the Korsch equations.
Figure 5B:
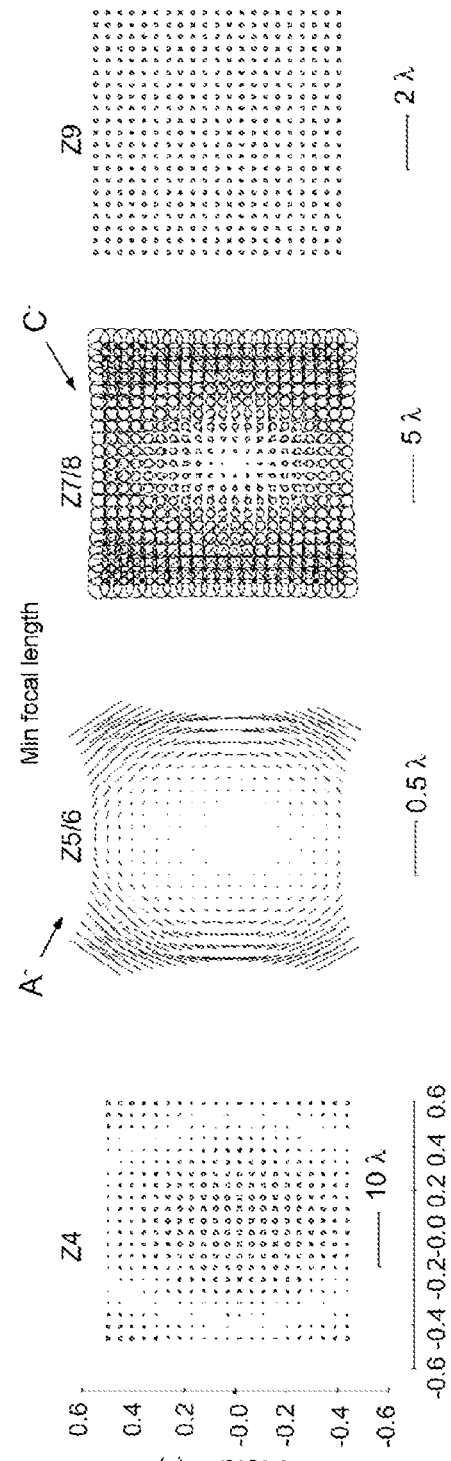

FIGS. 5a and 5b illustrate the aberrations present in the focal plane (position of the detector) for a two-focal-length telescope the three aspherical mirrors M1, M2 and M3 of which have initial parameters obtained by solving the Korsch equations in the way explained above.

FIG. 5a illustrates the aberrations for the maximum focal length fmax, and FIG. 5b for the minimum focal length fmin.

It will be recalled that defocus corresponds to Z4, astigmatism to Z5 and Z6 (Z5/6), coma to Z7 and Z8 (Z7/8) and spherical aberration to Z9.

Figure 6:
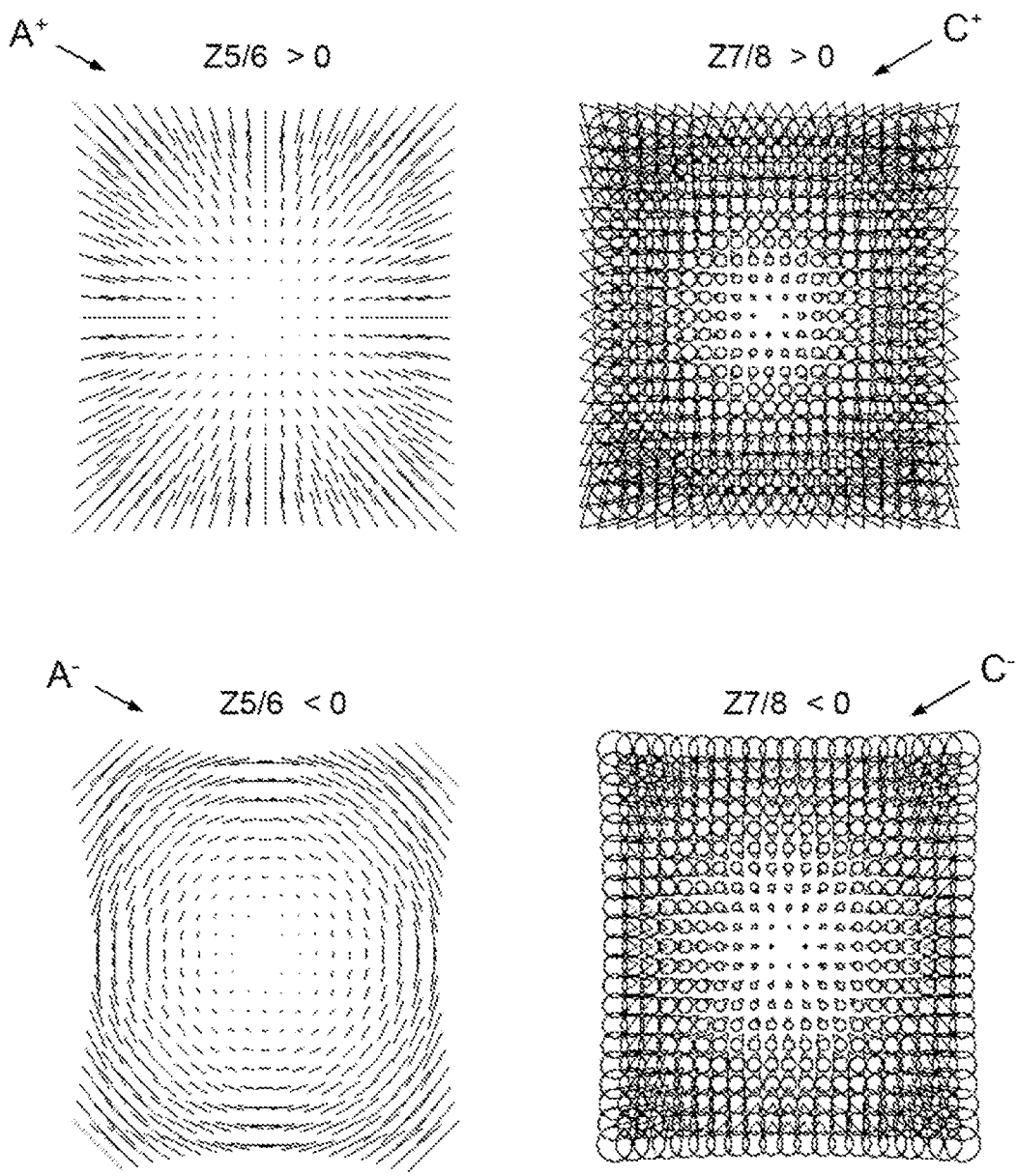
FIG. 6 illustrates the sign convention used for certain categories of aberrations.

In order to more precisely characterize the various categories of aberrations studied, we will adopt the sign convention illustrated in FIG. 6.

We will denote:
"radial" astigmatism: astigmatism for which the tangential focal point is located before the sagittal focal point. Below, this astigmatism will be considered by convention to be negative and will be denoted $A^+$;

"tangential" astigmatism: astigmatism for which the sagittal focal point is located before the tangential focal point. Below, this astigmatism will be considered by convention to be positive and will be denoted $A^-$;

"external" coma: coma for which the shape of the image spot of a point source is a "comet" the tail (i.e. the widest portion) of which is directed away from the optical axis. It is a question of the coma created by a bifocal lens. Below, this coma will be considered by convention to be positive and will be denoted $C^+$;

"internal" coma: coma for which the shape of the image spot of a point source is a "comet" the tail of which is directed toward the optical axis. Below, this coma will be considered by convention to be negative and will be denoted $C^-$.

It may be seen in FIGS. 5a and 5b that these aberrations, with the exception of spherical aberration Z9, are variable in the (X, Y) field of the telescope. The dominant aberrations for this initial configuration of the telescope are:

Dominant initial aberrations for the maximum focal length (FIG. 5a):
The astigmatism (Z5/6)>0 denoted $A^+$, and the coma (Z7/8)>0 denoted $C^+$.
Dominant initial aberrations for the minimum focal length (FIG. 5b):
The astigmatism (Z5/6)<0 denoted $A^-$, and the coma (Z7/8)<0 denoted $C^-$.
The telescope cannot be used in this state because the aberrations are too great.

Figure 7:
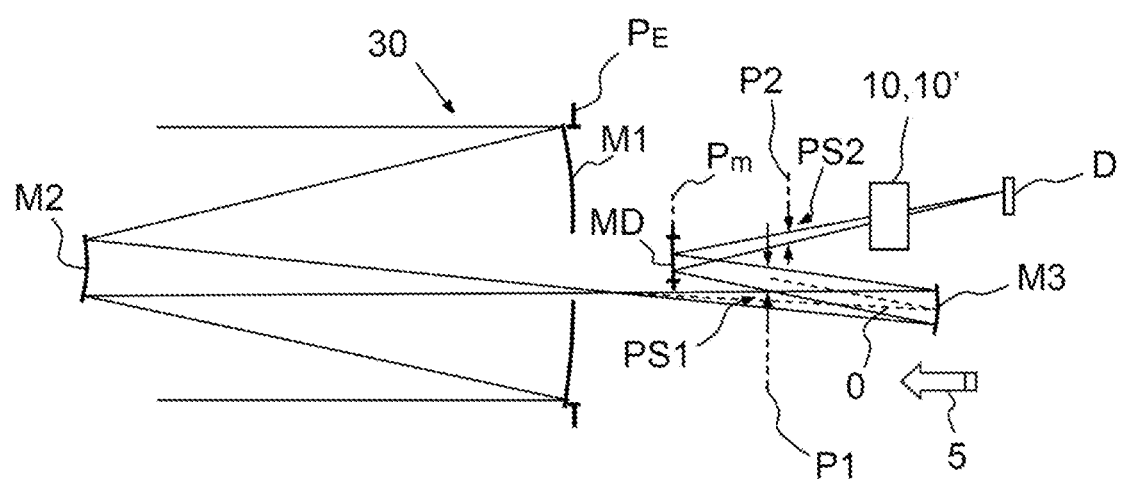
FIG. 7 schematically shows a Korsch telescope according to the invention.

The Korsch telescope 30 according to the invention illustrated in FIG. 7 is a telescope 20 such as illustrated in FIGS. 2 to 4 and which furthermore comprises a deformable mirror MD such as described above. A telescope of this type is usable in a space environment, but also on the ground for observation or surveillance.

To limit the size of the deformable mirror MD the latter is placed in a fixed median position PM located between the first position P1 of the exit pupil PS1 (minimum focal length) and the second position P2 of the exit pupil PS2 (maximum focal length).

The means for changing the optical path, which are configured so that the detector remains positioned in the focal plane of the telescope, i.e. means such as described above (for example 10 and 10'), are then placed between the deformable mirror MD and the detector D, such as illustrated in FIG. 7.

In the case of a telescope 30 according to the invention, the exit pupil does not remain stationary and depends on the focal length of the zoom. The exit pupil moves (order of magnitude ~200 mm) depending on the chosen focal length: the deformable mirror MD can therefore not be used at the exit pupil for all the focal lengths, and its position relative to the effective exit pupil varies depending on the chosen focal length. This has a very large impact: given the orders of magnitude of the movement of the exit pupil, the deformable mirror will work in the field: the impact of the aberrations applied by deforming the surface of the mirror MD in order to attempt to compensate for the aberrations of the system, i.e. aberrations such as illustrated in FIGS. 5a and 5b, is no longer constant in the field. Therefore, the aberrations applied to the deformable mirror will create new aberrations in the system. For example, as explained below, introducing spherical aberration into the deformable mirror when it is away from the exit pupil, introduces, into the telescope, astigmatism and coma in much greater proportions than spherical aberration.

Let us now study which aberrations are able to be corrected by a deformable mirror placed in the interpupil zone.

In what follows it is necessary not to confuse aberrations due to the telescope, i.e. corresponding to defects in the telescope considered as an optical system, and aberrations introduced via the form of the deformable mirror, which are denoted with the index MD.

FIGS. 8a and 8b illustrate, for the initial system, the aberrations that result following the introduction of spherical aberration $Z9_{MD}$ into a deformable mirror ($Z9_{MD}>0$ in FIG. 8a and $Z9_{MD}<0$ in FIG. 8b) as a function of its relative position with respect to the effective exit pupil PS, when it is located downstream of PS with respect to the mirror M3.

FIGS. 9a and 9b illustrate, for the initial system, the aberrations that result following the introduction of spherical aberration $Z9_{MD}$ into a deformable mirror (with $Z9_{MD}>0$ in FIG. 9a and $Z9_{MD}<0$ in FIG. 9b) as a function of its relative position with respect to the effective exit pupil PS, when it is located upstream of PS with respect to the mirror M3.

The deformable mirror MD being placed between P1 and P2, it is located, as shown in FIGS. 8a and 8b for the max focal length (downstream of PS2 with respect to M3) and, as shown in FIGS. 9a and 9b for the min focal length (upstream of PS1 with respect to M3).

It may be seen from FIGS. 8 and 9 that the introduction of spherical aberration $Z9_{MD}$ into the deformable mirror MD introduces aberrations such as astigmatism and coma into the telescope. This means that the deformable mirror MD may compensate for aberrations that are the inverse of those created by $Z9_{MD}$.

From FIGS. 8a and 8b it may be deduced that for the max focal length fmax:
introducing $Z9_{MD}>0$ creates astigmatism <0 and coma <0, this allowing astigmatism >0 and coma >0 to be corrected.
introducing $Z9_{MD}<0$ creates astigmatism >0 and coma >0, this allowing astigmatism <0 and coma <0 to be corrected.

From FIGS. 9a and 9b it may be deduced that for the min focal length fmin:
introducing $Z9_{MD}>0$ creates astigmatism <0 and coma >0, this allowing astigmatism >0 and coma <0 to be corrected
introducing $Z9_{MD}<0$ creates astigmatism >0 and coma <0, this allowing astigmatism <0 and coma >0 to be corrected.

Thus, by placing the deformable mirror MD between P1 and P2, $Z9_{MD}$ of a given sign allows, for the two extreme focal lengths, astigmatisms of the same given sign and comas of opposite sign to be simultaneously corrected.

For example, $Z9_{MD}>0$ allows $A^+$ and $C^+$ to be corrected for fmax and $A^+$ and $C^-$ to be corrected for fmin.

This correctional capacity is incompatible with the initial system, the aberrations to be corrected of which are illustrated in FIGS. 5a and 5b.

Thus, by applying, to the two-focal-length telescope, a conventional method for optimizing its parameters using the Korsch equations (initial configuration of the 3-mirror telescope) and by attempting to compensate for aberrations using a deformable mirror, a dead end is reached: MD placed in the interpupil zone is unable to simultaneously correct the astigmatism and coma present, in the working system, at the minimum focal length and the maximum focal length.

After much work, the inventors have identified a way of producing a zoomable Korsch telescope having a very good image quality.

In the telescope 30 according to the invention, the third mirror M3 has a new conicity c'3 determined from the initial conicity c3 (calculated from the Korsch equations in the first optimization in the way explained above).

The new conicity c'3 is determined so that the three-aspherical-mirror anastigmat telescope has, in the absence of the MD, and for the minimum and maximum focal lengths, aberrations that are compensable by the MD.

On account of the teaching of FIGS. 8 and 9, it is sought to obtain a configuration of the telescope M1/M2/M3 (without MD) having:

For the maximum focal length: positive astigmatism $A^+$ and positive coma $C^+$.

For the minimum focal length: positive astigmatism A⁺ and negative coma C⁻.

In FIGS. 5a and 5b, it may be seen that the astigmatism for the minimum focal length is negative. The new conicity c'3 is therefore determined so as to modify the sign of the telescope astigmatism in the absence of the deformable mirror, for the minimum focal length, i.e. so as to convert the negative astigmatism of the system into a positive astigmatism for the minimum focal length.

Figure 10:
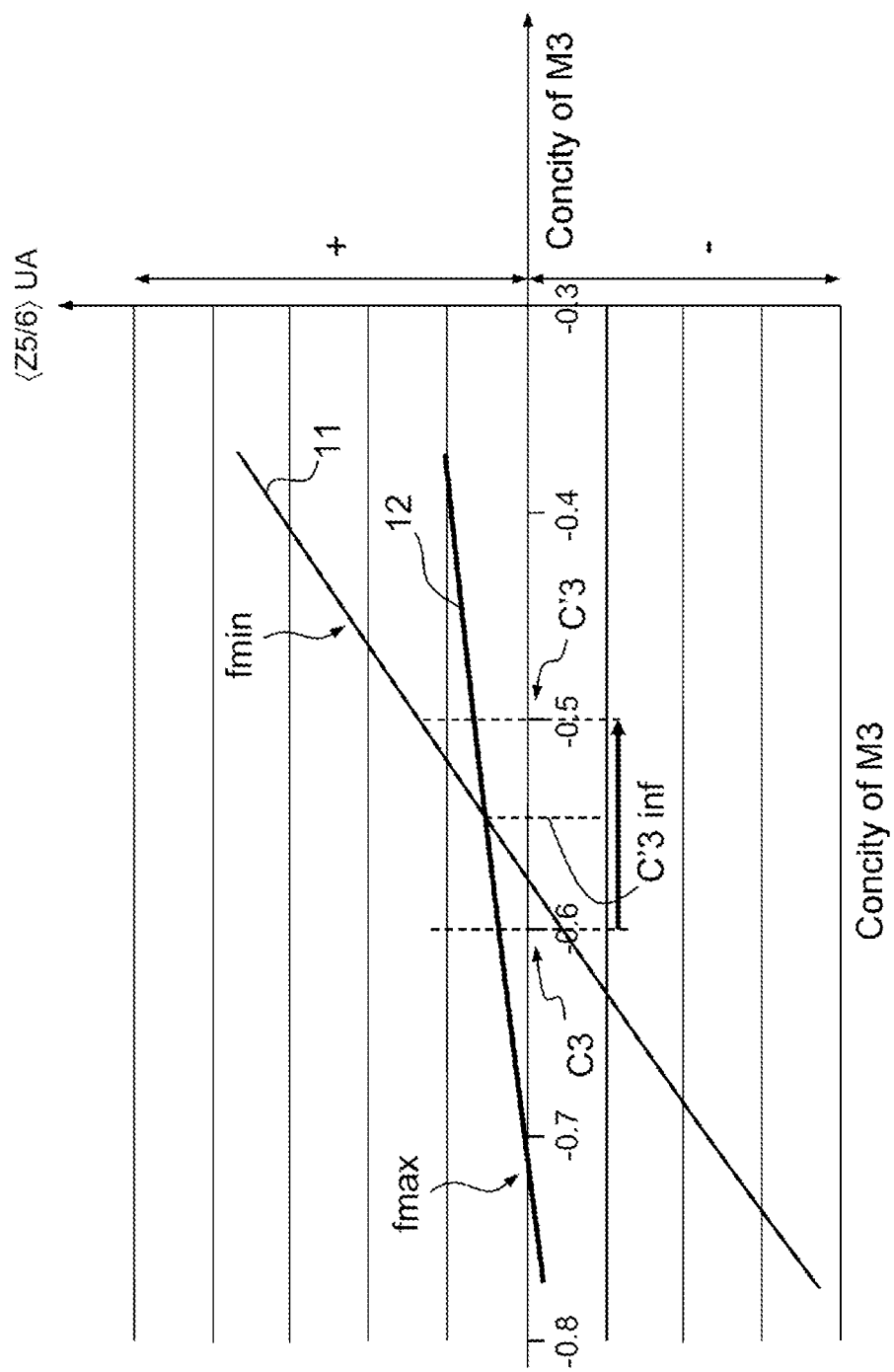
FIG. 10 illustrates the variation in the average value of the astigmatism of the telescope as a function of the conicity value of M3.

FIG. 10 illustrates the variation in the average value of the astigmatism<Z5/6> of the 3-mirror telescope (without the MD) in arbitrary units, for the min focal length (curve 11) and max focal length (curve 12), as a function of the conicity value of M3. With the initial conicity c3=−0.61, the astigmatism is positive for fmax and negative for fmin.

This figure demonstrates the existence of a value of c'3inf at which the sign of the astigmatism at the min focal length inverts, here −0.56. For a new conicity c'3 higher than or equal to c'3inf, the astigmatism of the min focal length changes sign. The new value of c'3 cannot furthermore be too greatly different from the initial value c3 in order to maintain the convergence of the optical system.

A second optimization of image quality is then carried out, starting with the value c'3inf, in order to determine the new conicity c'3, the median position Pm of MD and the forms of its surface Smin for fmin and Smax for fmax allowing the best image quality to be obtained according to the preset criterion.

Given that the aberrations able to be compensated for by the mirror are already known (see FIGS. 8 and 9) it is known that the form of the surface S of the deformable mirror MD suitable for compensating for the aberrations of the optical system comprising M1, M2, and M3 of conicity c'3, must comprise a first type of aberration, here in the example first-order spherical aberration $Z9_{MD}$ and more particularly positive $Z9_{MD}$.

Thus, the exact value of the new conicity c'3, the fixed median position Pm of the deformeable mirror, which position is common to the two focal lengths, and the forms of the surface of MD, Smin for fmin and Smax for fmax, are determined via a second optimization of the optical paths in the instrument, so as to correct the aberrations of the 3-mirror telescope having a new conicity c'3 and to optimize image quality in the focal plane of the telescope according to the preset criterion, typically the minimization of a wavefront error WFE.

The modification of the conicity of M3 makes it possible to invert the sign of the astigmatism at the min focal length, and thus to introduce into the optical system aberrations such that the aberrations resulting from the optical system may be compensable by an MD with a fixed position in the interpupil zone.

Preferably, the aberrations introduced by c'3 (without MD) are astigmatism and coma.

Figure 11A:
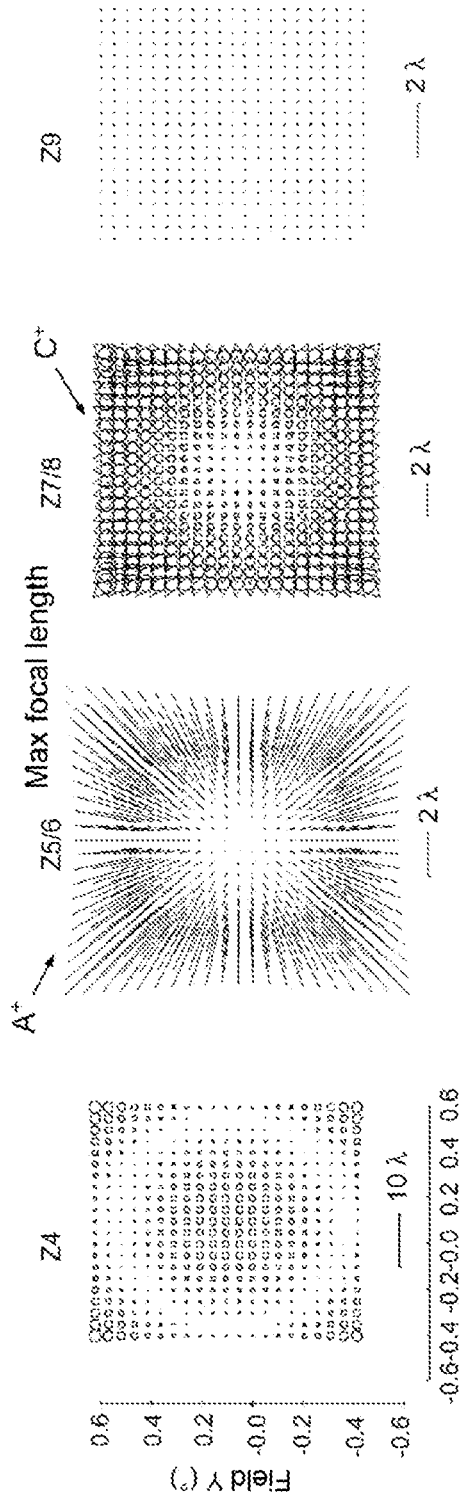
FIGS. 11a and 11b illustrate the various aberrations present in the focal plane of the telescope with M3 having a conicity c'3=−0.52.
Figure 11B:
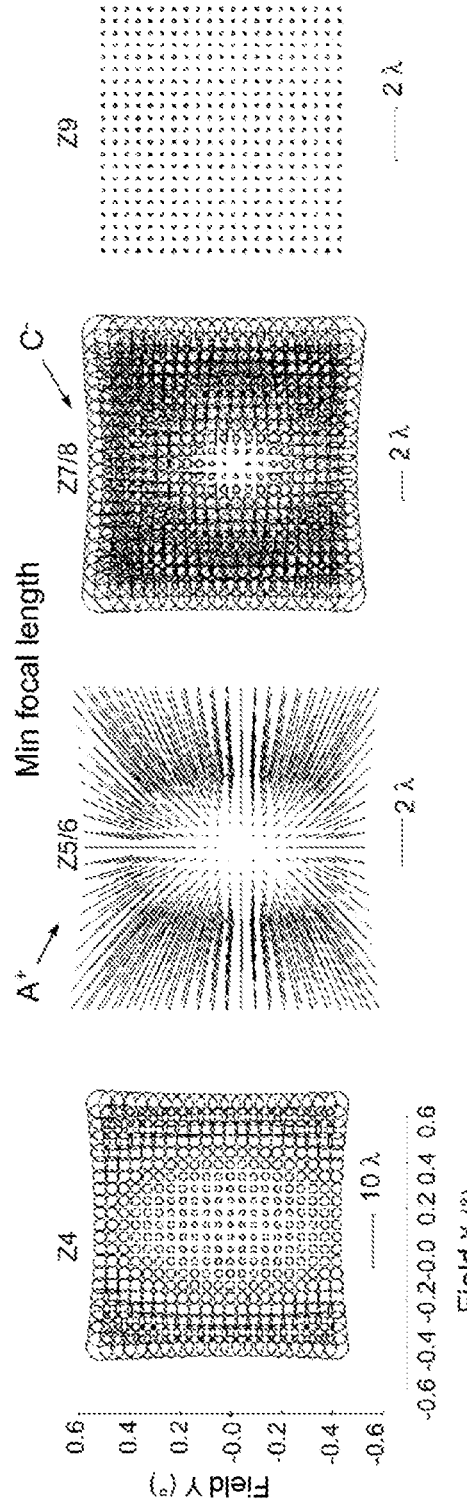

FIGS. 11a and 11b illustrate the various aberrations present in the focal plane of the 3-mirror telescope the M3 of which has the conicity c'3=−0.52.

The new value c'3 of the conicity of M3 allows positive astigmatisms to be obtained for all the focal lengths and comas of opposite signs to be obtained for the extreme focal lengths.

In the example, the new conicity c'3 differs by about 20% from the initial conicity c3. Preferably, the new conicity c'3 differs from the initial conicity c3 by more than 5% and by less than 30%.

Figure 12:
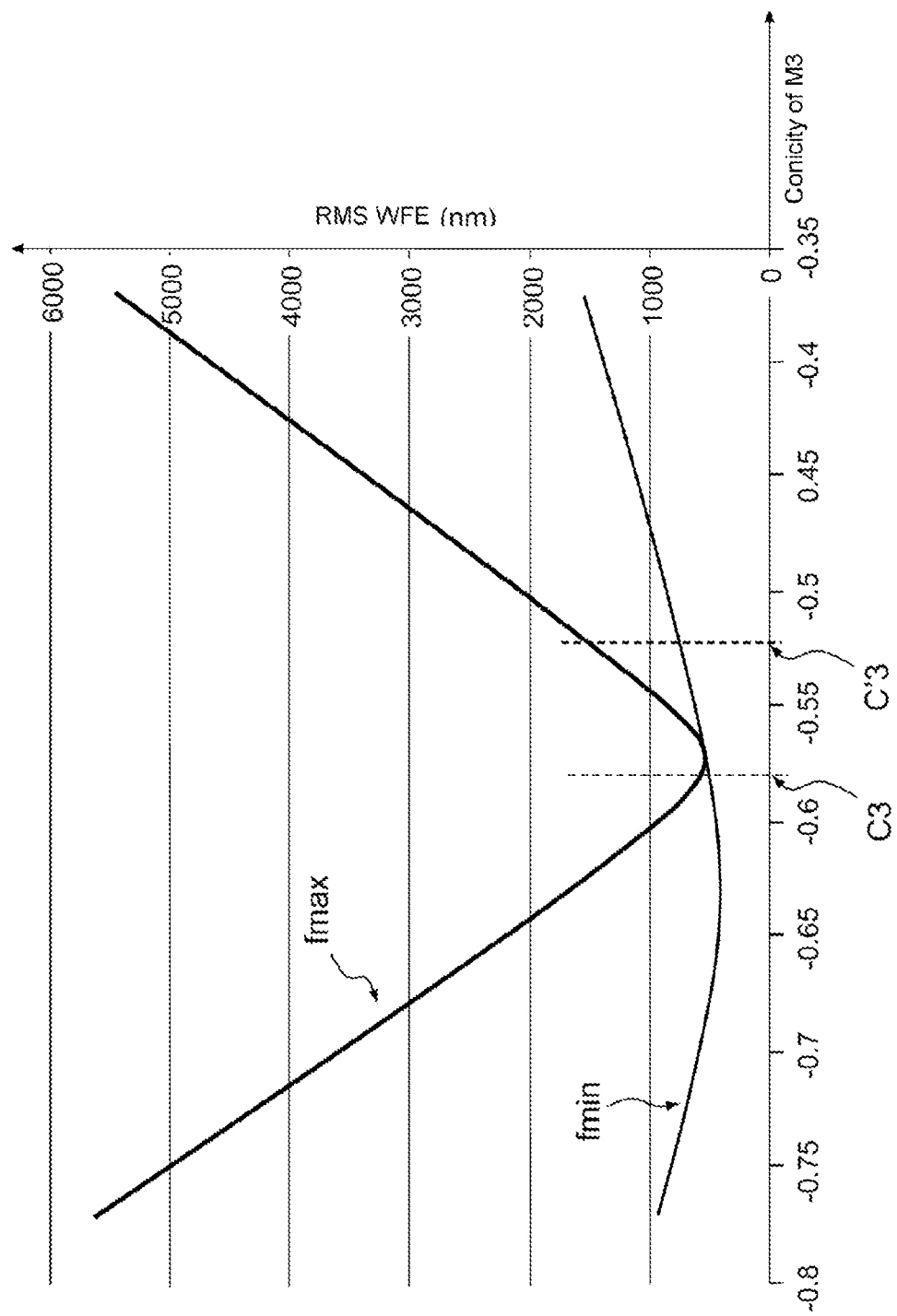
FIG. 12 illustrates the variation in the root-mean-square value of the wavefront error RMS WFE as a function of the conicity value of M3.

FIG. 12 illustrates the variation in the root-mean-square value of the wavefront error RMS WFE as a function of the conicity value of M3, for the min focal length (curve 15) and the max focal length (curve 16). It may be seen that the initial conicity c3 corresponded to the optimized value of image quality, a new conicity value c'3 higher than −0.56 leading to an increase in WFE, i.e. to a decrease in image quality. The change in value of the conicity of M3 is not in response to a need for image quality, but allows aberrations that are compensable by an MD to be obtained. Image quality is no longer optimum with the aim of allowing aberrations to be corrected.

Figure 14:
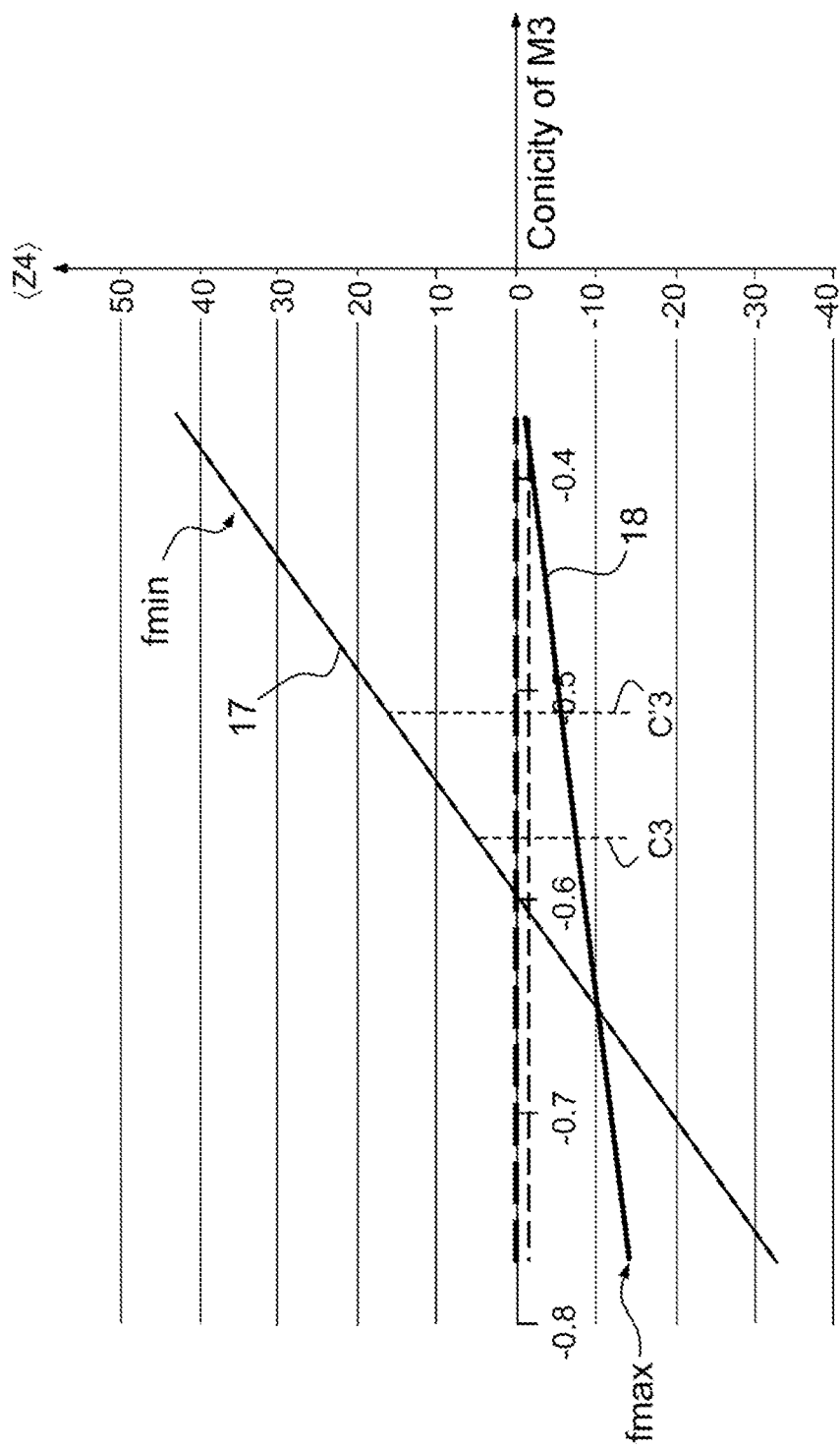
FIG. 14 illustrates the variation in the average defocus <Z4> of the 3-mirror telescope without the deformable mirror as a function of the value of the conicity of M3.

The introduction of spherical aberration $Z9_{MD}$ via the deformable mirror allows the Z7/8 (coma) and Z5/6 (astigmatism) of the system to be greatly decreased, but does not decrease defocus Z4. On the contrary, $Z9_{MD}$ will also lead to an increase in the Z4 of the telescope as illustrated in FIG. 14, which illustrates the variation in the average defocus <Z4> of the system (3-mirror telescope without MD) as a function of the value of the conicity of M3, for the min focal length (curve 17) and the max focal length (curve 18): it may be seen that defocus Z4 increases substantially, in particular for the min focal length.

It is therefore recommended to introduce a second type of aberration into the form of the surface of MD, in order to compensate for the defocus present in the system.

In the example, defocus $Z4_{MD}$ is introduced in order to compensate for the Z4 of the system (that initially present and that introduced by $Z9_{MD}$ (first aberration)). The introduction of $Z4_{MD}$ also allows the coma and astigmatism values to be balanced, i.e. to bring the values of the respective coefficients close together, thereby allowing the compensation by the $Z9_{MD}$ to be improved.

On the basis of the range identified for c'3, the final value of c'3, the value PM, the $Z9_{MD}$ and the $Z4_{MD}$ for Smax (surface of the MD for fmax) and for Smin (surface of the MD for fm in), are determined via a second optimization.

Figure 13A:
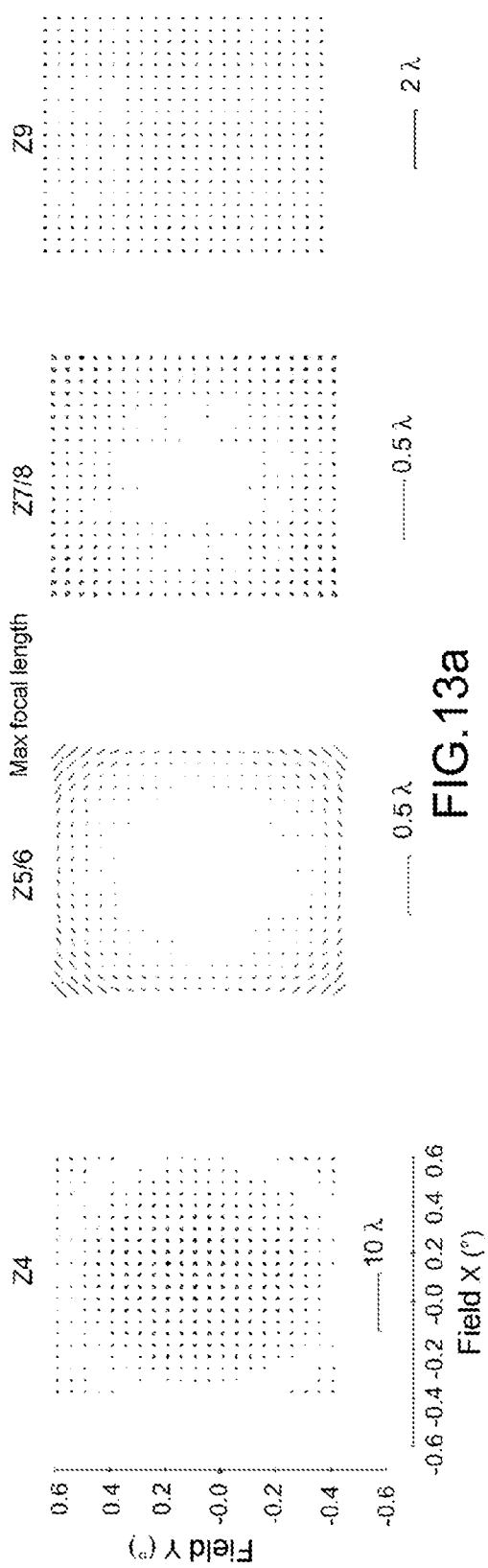
FIGS. 13a and 13b illustrate the various aberrations in the focal plane of a telescope according to the invention, the mirror M3 of the telescope having a new conicity c'3 and the deformable mirror of the telescope having a median position Pm and optimized values of $Z9_{MD}$ and of $Z4_{MD}$ ($Z9_{MD/max}$ and $Z9_{MD/min}$; $Z4_{MD/max}$ and $Z4_{MD/min}$).
Figure 13B:
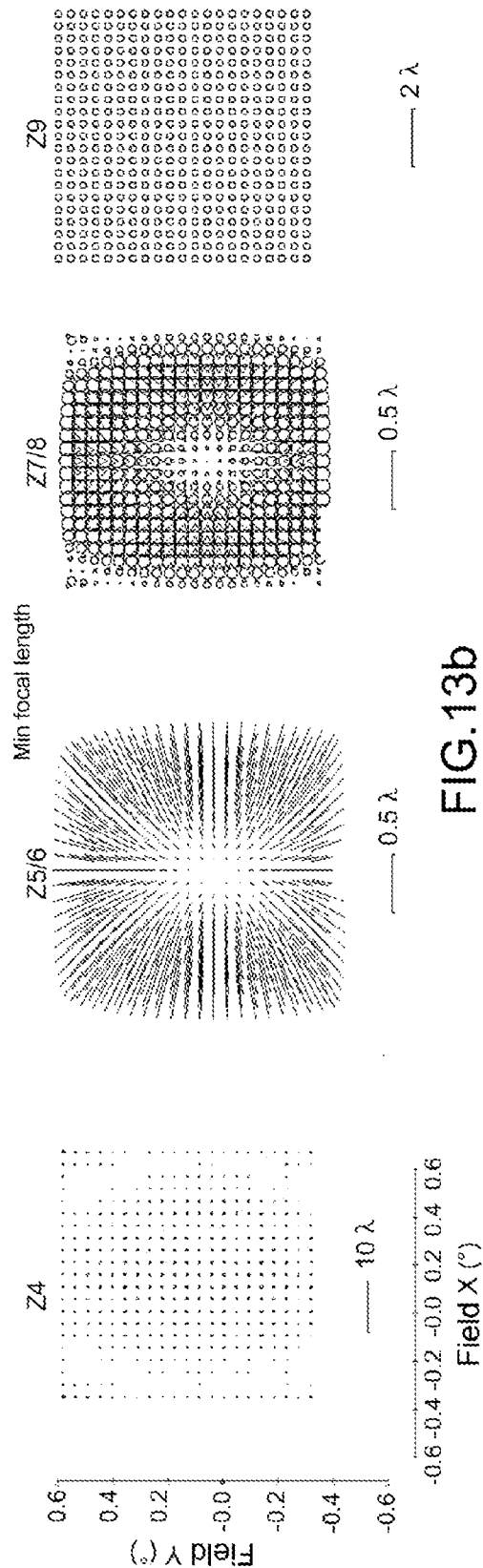

FIGS. 13a and 13b illustrate the various aberrations in the focal plane of a telescope 30 according to the invention, the mirror M3 of the telescope having a new conicity c'3 and the deformable mirror of the telescope having a median position Pm and optimized values of $Z9_{MD}$ and of $Z4_{MD}$ ($Z9_{MD/max}$ and $Z9_{MD/min}$; $Z4_{MD/max}$ and $Z4_{MD/min}$). FIG. 13a illustrates the various aberrations for the max focal length and FIG. 13b for the min focal length.

The form of the surface Smax for the max focal length therefore comprises $Z9_{MD/max}$ and $Z4_{MD/max}$. The form of the surface Smin for the min focal length therefore comprises $Z9_{MD/min}$ and $Z4_{MD/min}$.

With the example c'3=−0.52, the deformable mirror MD is positioned 110 mm after PS1 and 140 mm before PS2.

It may be seen by comparing FIGS. 13a and 13b with FIGS. 5a and 5b (note the change of scale) that the quality of the telescope is greatly improved.

According to one embodiment, to further improve image quality, the conicities of the mirrors M2 and M1 of the telescope 30 according to the invention are modified slightly.

In our example, the performance of the telescope may be further improved, the Z7/8 and Z9 being compensated for only by the $Z9_{MD}$.

Modifying the conicity of M2 (new c'2 value) allows exactly these two aberrations to be adjusted. However, this new conicity c'2 also introduces a large amount of Z4. This excess of Z4 is counterbalanced by modifying the conicity of M1 (new c'1 value), which also modifies the Z9.

Thus, a new conicity c'1 is determined for the first mirror and a new conicity c'2 is determined for the second mirror from a first initial conicity c1 of the first mirror and a second initial conicity c2 of the second mirror, respectively, so as to further improve the image quality of the telescope according to the preset criterion.

Figure 15:
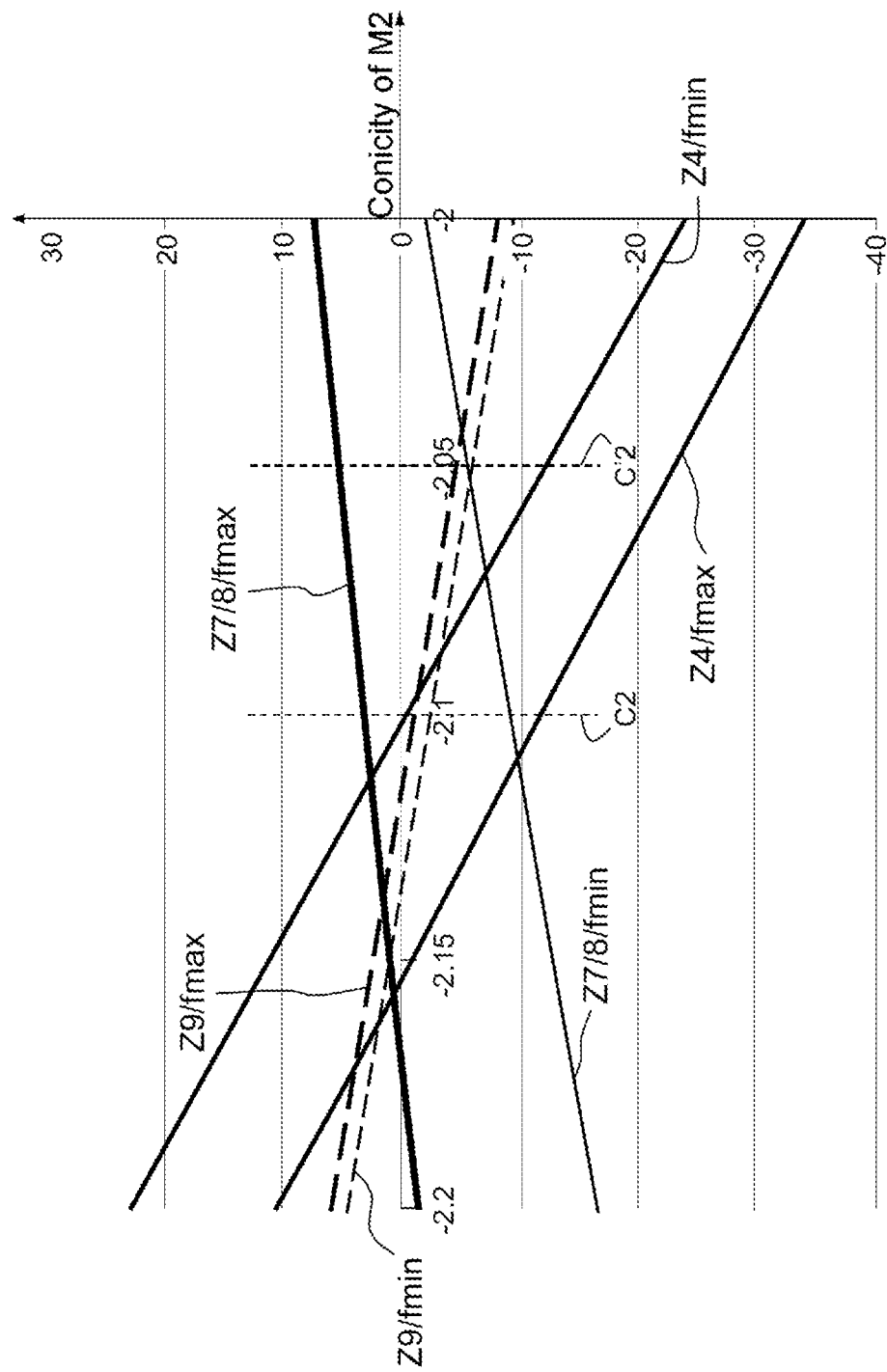
FIG. 15 illustrates the variation in the main aberrations as a function of the value of the conicity of M2, for the min and max focal lengths.
Figure 16:
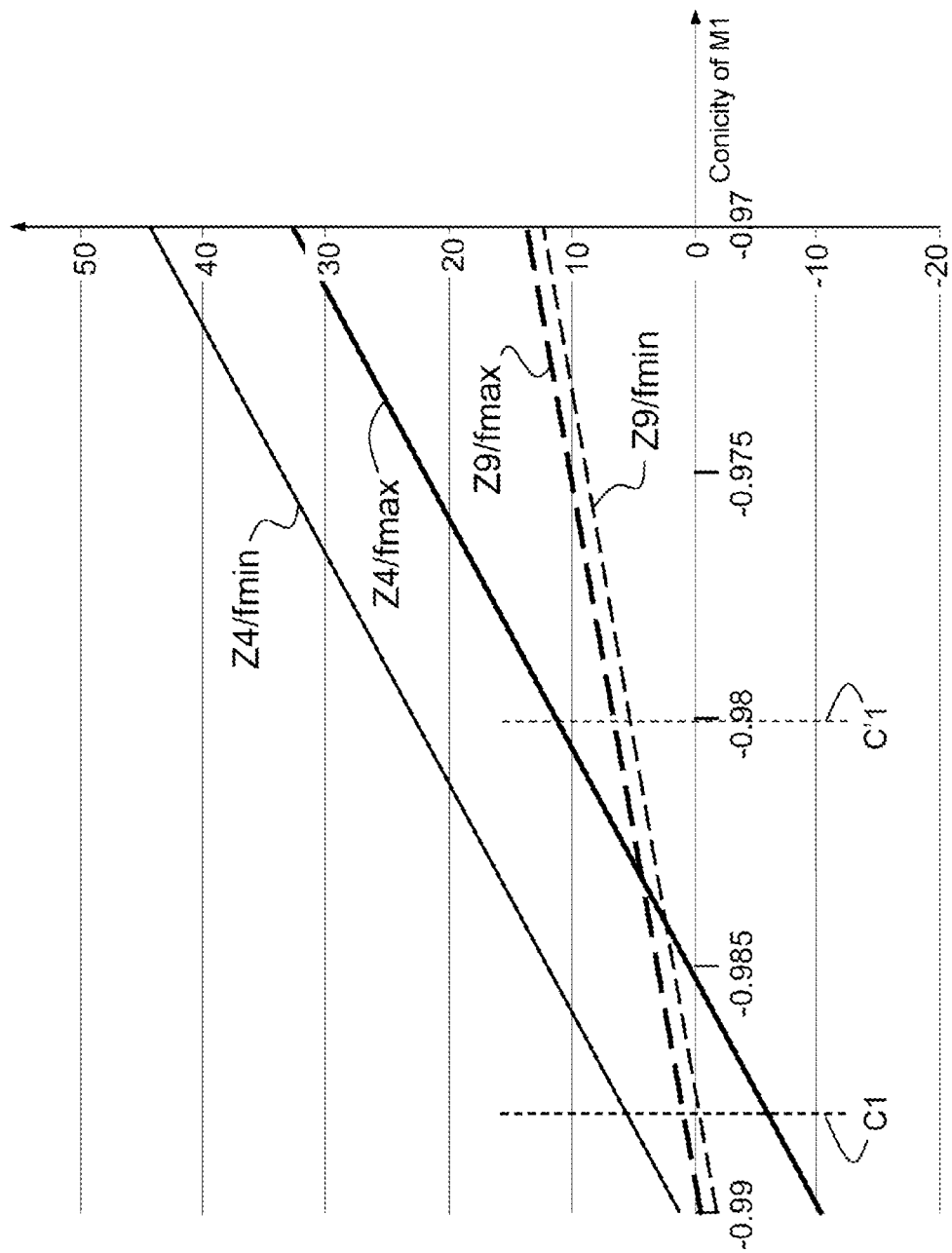
FIG. 16 illustrates the variation in the main aberrations as a function of the value of the conicity of M1, for the min and max focal lengths.

For example, these modifications are illustrated in FIGS. 15 and 16.

FIG. 15 illustrates the variation in the main aberrations as a function of the value of the conicity of M2, for the min and max focal lengths, and FIG. 16 the variation in the main aberrations as a function of the value of the conicity of M1.

As illustrated in FIGS. 15 and 16, a third optimization is used to determine the new conicity values c'2 and c'1:

c'1=−0.98
c'2=−2.1

By comparing them to the initial values c1=−1 and c2=−2, it may be seen that these conicity variations are small (less than 10%, or even less than 5% for c1), but nevertheless allow image quality to be further improved.

As a variant, a third type of aberration, here $Z16_{MD}$, i.e. second-order spherical aberration, which influences Z16, Z9, Z4 Z5/6 and Z7/8 and allows image quality to be further increased, is also added.

FIGS. 17a and 17b illustrate the various aberrations in the focal plane of a telescope 30 according to the invention, the mirrors M1, M2 and M3 of the telescope respectively having new conicities c'1, c'2 and c'3 and the deformable mirror MD having a median position Pm and optimized values of $Z9_{MD}$, $Z4_{MD}$ and $Z16_{MD}$. FIG. 17a illustrates the various aberrations for the max focal length and FIG. 17b for the min focal length.

It may be seen by comparing FIGS. 17a and 17b with FIGS. 13a and 13b (note the change of scale) that the quality of the telescope is further improved. The obtained final image quality is compatible with the constraint of an RMS WFE <λ/15, which in the visible corresponds to a RMS WFE <50 nm (see FIG. 19 below).

Contrary to what is conventionally the case, in the telescope 30 according to the invention the mirror MD forms an integral part of the optics of the instrument.

To obtain a zoom capability, the telescope 30 according to the invention has a plurality of intermediate focal lengths fi (integer index). The form of that surface Sfi of the deformable mirror which is associated with each intermediate focal length fi is calculated from the form that the surface has at the minimum focal length, i.e. Smin, and at the maximum focal length, i.e. Smax, in order to apply a suitable correction to MD.

For the example, once the aberrations $Z9_{MD}$, $Z4_{MD}$ and $Z16_{MD}$ have been optimized for fmin and fmax, i.e. once the values of the coefficients of the fringe Zernike polynomials have been determined for fmin and fmax, values are calculated for the polynomial coefficients for each focal length, from the values of the coefficients of the fringe Zernike polynomials determined for fmin and fmax.

According to one variant, the telescope according to the invention includes an aperture diaphragm placed in the interpupil zone and the aperture of which may be adjusted in order to keep a numerical aperture substantially constant when focal length changes.

Figure 18:
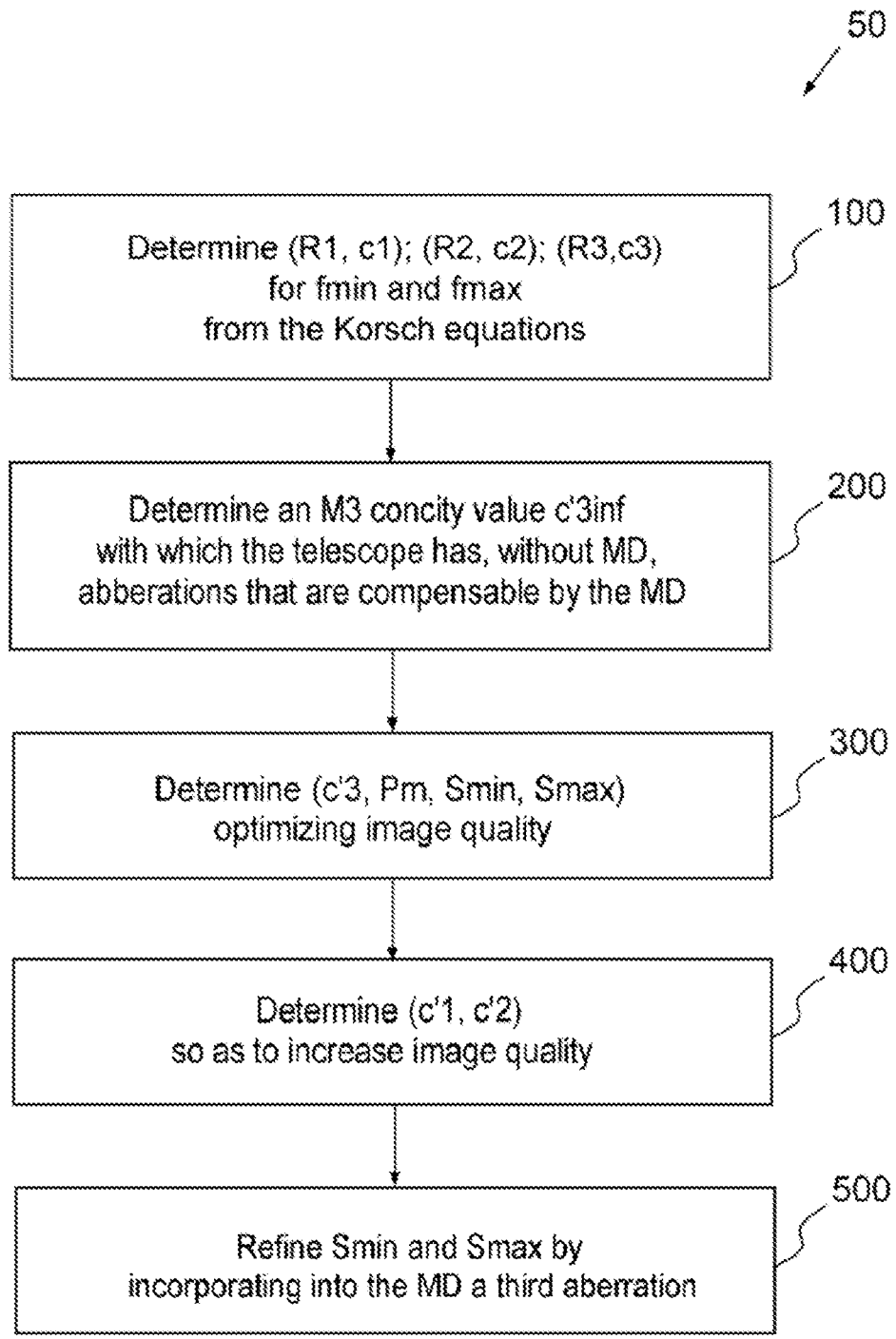
FIG. 18 illustrates the method for determining parameters of an anastigmat telescope according to the invention.

According to another aspect, the invention relates to a method 50 for determining parameters of an anastigmat telescope, which method is illustrated in FIG. 18, the telescope comprising:

three aspherical mirrors, a concave first mirror M1, a convex second mirror M2, and a concave third mirror M3;
a detector D;
a deformable and controllable mirror MD; and
means 5 for moving the third mirror linearly along the optical axis O of the telescope so as to make the focal length of the telescope change between a minimum focal length fmin and a maximum focal length fmin.

The three mirrors M1, M2 and M3 are arranged so that the first mirror and the second mirror form from an object at infinity an intermediate image between the second mirror and the third mirror, the third mirror forming from this intermediate image a final image in the focal plane of the telescope in which the detector D is placed.

The first, second and third mirrors are of set form characterized by a conicity and a radius of curvature.

Furthermore, the telescope has at the minimum focal length a first exit pupil PS1 in a first position P1, and the telescope has at the maximum focal length a second exit pupil PS2 in a second position P2.

The deformable mirror MD has a deformable surface and is placed in a fixed median position Pm between the first and second positions.

The method 50 comprises a first step 100 in which values, termed initial values, are determined for the conicities and radii of curvature of the first, second and third mirrors of the telescope respectively:

M1 (c1, R1); M2 (c2, R2); M3 (c3, R3).

These initial values, which are compatible with the minimum focal length fmin and the maximum focal length fmax in the absence of the deformable mirror MD, are determined from the Korsch equations, via a first optimization of the image quality in the focal plane of the telescope according to a preset criterion.

In a second step 200, a conicity value c'3inf is determined for the third mirror, from the initial conicity c3 of the third mirror, with which value the telescope has, in the absence of deformable mirror MD and at the minimum and maximum focal lengths, aberrations that are compensable by the deformable mirror MD.

Next, in a step 300, the following are determined via a second optimization: a new conicity value c'3 for the third mirror, the fixed median position Pm of MD, the form of its surface Smin at the minimum focal length and the form of its surface Smax at the maximum focal length, so as to correct the compensable aberrations and to optimize the image quality in the focal plane of the telescope according to the preset criterion. The determination of the form of the surface of the deformable mirror is based on the application of at least a first aberration and a second aberration.

For the intermediate focal lengths, where appropriate, the deformable-mirror form associated with each intermediate focal length is calculated from Smin and Smax.

Preferably, the method 50 furthermore comprises a step 400 consisting in determining a new conicity c'1 for the first mirror and a new conicity c'2 for the second mirror M2, so as to further improve image quality according to the preset criterion.

Preferably, the method 50 according to the invention also comprises a step 500 consisting in refining the determined form of the surface Smin of the deformable mirror for fmin and the form of the surface Smax of the deformable mirror for fmax by incorporating a third aberration $Z16_{MD}$ so as to further improve image quality according to the preset criterion.

Likewise, for the intermediate focal lengths, where appropriate, the deformable-mirror form associated with each intermediate focal length and incorporating the third aberration is calculated from Smin and Smax.

Typically, the preset criterion consists in minimizing a wavefront error WFE.

Figure 19:
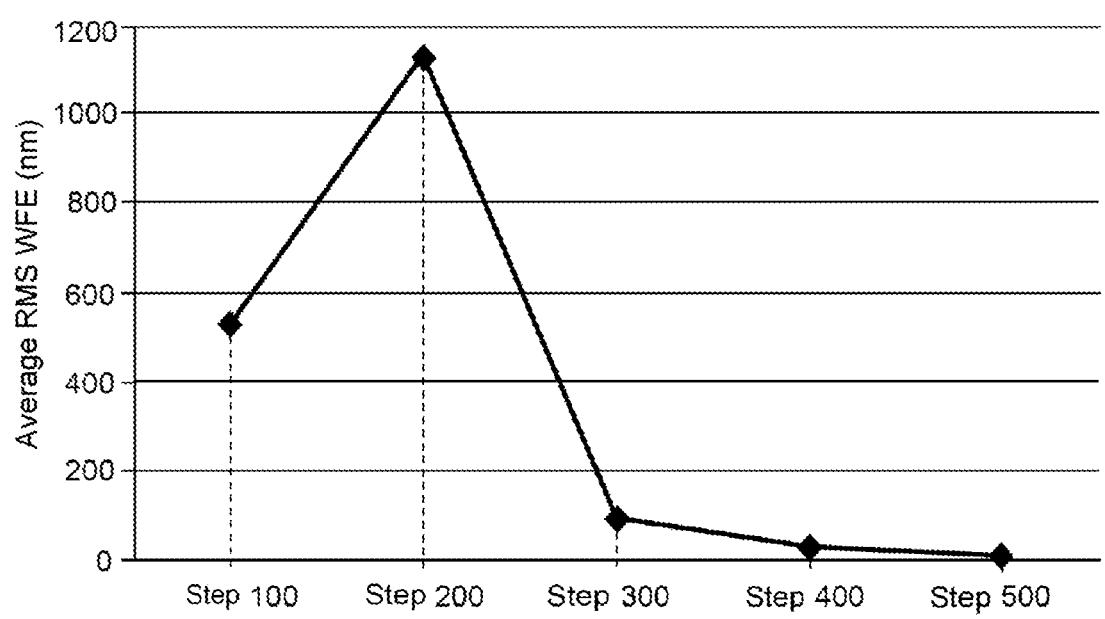
FIG. 19 illustrates the variation in the WFE averaged over the various focal lengths, after each step of the method.

FIG. 19 illustrates the variation in the RMS WFE averaged over the various focal lengths at the end of each step of the method, i.e. as a function of the various modifications made to the optical system, for the example telescope configuration given above.

The WFE obtained after the first optimization based on the Korsch equations is about 560 nm, incompatible with the RMS WFE constraint <50 nm. By modifying the conicity value of M3 in order to modify the sign of the astigmatism, the WFE is degraded (as yet no optically active deformable mirror: its surface is planar). In contrast, by introducing first-order spherical aberration and defocus into the surface of the deformable mirror, the WFE is greatly improved by about 100 nm. The modification of the conicities of M1 and M2 allows the WFE to be decreased below about fifty nm, and the final optimization, introducing second-order spherical aberration, allows it to be further decreased to about ten nm.

The invention claimed is:

1. A three-aspherical-mirror anastigmat telescope comprising at least a concave first mirror, a convex second mirror, a concave third mirror and a detector, and having an optical axis,
the three mirrors being arranged so that the first mirror and the second mirror form from an object at infinity an intermediate image between the second mirror and the third mirror, the third mirror forming from this intermediate image a final image in the focal plane of the telescope, in which plane the detector is placed, the first, second and third mirrors being of a set form characterized by at least a radius of curvature and a conicity,
the third mirror being movable linearly along the optical axis of the telescope so as to make the focal length of the telescope change between at least a minimum focal length and a maximum focal length,
the telescope having at the minimum focal length a first exit pupil in a first position, and the telescope having at the maximum focal length a second exit pupil in a second position, the telescope further comprising:
a deformable and controllable mirror having a deformable surface and placed in a fixed median position between the first and second positions,
an optomechanical device adapted for changing the optical path between the deformable mirror and the detector, which optomechanical device is configured so that the detector remains positioned in the focal plane of the telescope,
the third mirror having a new conicity determined from an initial conicity,
the initial conicity being determined from the Korsch equations,
the new conicity being determined so that the telescope has, in the absence of said deformable mirror and for the minimum and maximum focal lengths, aberrations which are astigmatism and coma, said aberrations being compensable by said deformable mirror said new conicity differing from the initial conicity by more than 5% and by less than 30%,
said fixed median position of said deformable mirror and the form of its surface, for the minimum focal length and maximum focal length, respectively, being determined so as to correct said compensable aberrations and to optimize image quality in the focal plane of the telescope according to a preset criterion, said preset criterion comprising minimization of a wavefront error, said form of the surface of the deformable mirror comprising at least a first aberration category which is first order spherical aberration and a second aberration category which is defocus.

2. The telescope as claimed in claim 1, wherein the form of the surface of the deformable mirror further comprises a second-order spherical aberration in order to further improve image quality according to said criterion.

3. The telescope as claimed in claim 1, wherein a new conicity of the first mirror and a new conicity of the second mirror are respectively determined from an initial conicity of the first mirror and an initial conicity of the second mirror,
the initial conicities being determined from the Korsch equations,
the new conicities being determined so as to further improve the image quality of said telescope according to said criterion.

4. The anastigmat telescope as claimed in claim 1, wherein the surface of the deformable mirror is defined from coefficients of polynomials.

5. The telescope as claimed in claim 1, wherein the compensable aberrations are astigmatism and coma.

6. The telescope as claimed in claim 1, wherein:
a positive astigmatism is defined as an astigmatism for which a tangential focal point is located before a sagittal focal point,
a negative astigmatism is defined as an astigmatism for which a sagittal focal point is located before a tangential focal point,
a positive coma is defined as a coma for which a shape of the image spot of a point source is a "comet" the tail of which is directed away from the optical axis and,
a negative coma is defined as a coma for which a shape of the image spot of a point source is a "comet" the tail of which is directed toward the optical axis,
the compensable aberrations being positive astigmatism and positive coma for the maximum focal length, and positive astigmatism and negative coma for the minimum focal length.

7. The telescope as claimed in claim 1, wherein:
a positive astigmatism is defined as an astigmatism for which a tangential focal point is located before a sagittal focal point,
a negative astigmatism is defined as an astigmatism for which a sagittal focal point is located before a tangential focal point,
and wherein the new conicity of the third mirror is determined so as to modify the sign of the astigmatism of the telescope for the minimum focal length, in the absence of the deformable mirror.

8. The telescope as claimed in claim 1, having a plurality of intermediate focal lengths, and wherein the form of the surface of the deformable mirror associated with each intermediate focal length is calculated from the form of the surface for the minimum focal length and maximum focal length.

9. A method for determining parameters of a three-aspherical-mirror anastigmat telescope comprising a concave first mirror, a convex second mirror, a concave third mirror, a detector, and a deformable and controllable mirror,
the third mirror being movable linearly along an optical axis of the telescope so as to make the focal length of the telescope change between a minimum focal length and a maximum focal length,
the three mirrors being arranged so that the first mirror and the second mirror form from an object at infinity an intermediate image between the second mirror and the third mirror, the third mirror forming from this intermediate image a final image in the focal plane of the telescope in which the detector is placed, the first, second and third mirrors being of a set form characterized by at least a radius of curvature and a conicity, the telescope having at the minimum focal length a first exit pupil in a first position, and the telescope having at the maximum focal length a second exit pupil in a second position, the deformable mirror having a deformable surface and being placed in a fixed median position between the first and second positions, the method comprising steps of:

determining values, and termed initial values, respectively for the conicities and radii of curvature of the first, second and third mirrors of said telescope, that are compatible with the minimum focal length and the maximum focal length, in the absence of said deformable mirror, from the Korsch equations, via a first optimization of the image quality in the focal plane of the telescope according to a preset criterion, determining a conicity value for the third mirror, from the initial conicity of the third mirror, with which the telescope has, in the absence of said deformable mirror and at the minimum and maximum focal lengths, aberrations which are astigmatism and coma, said aberrations being compensable by said deformable mirror, determining, via a second optimization, a new conicity value for the third mirror, said fixed median position of said deformable mirror and the form of its surface, for the minimum focal length and maximum focal length, respectively, so as to correct said compensable aberrations and to optimize image quality in the focal plane of the telescope according to the preset criterion, said preset criterion comprising minimization of a wavefront error, the determination of the form of the surface of the deformable mirror being based on at least a first aberration category and a second aberration category.

10. The method as claimed in claim 9, wherein the first aberration category is first-order spherical aberration and the second aberration category is defocus.

11. The method as claimed in claim 9, further comprising a step of determining a new conicity for the first and second mirrors so as to further improve image quality according to the preset criterion.

12. The method as claimed in claim 11, further comprising a step of refining the determined form of the surface of the deformable mirror by further incorporating a third aberration category so as to further improve image quality according to the preset criterion.

* * * * *